United States Patent
Mukherjee et al.

(10) Patent No.: US 9,779,233 B2
(45) Date of Patent: Oct. 3, 2017

(54) BROKER-BASED AUTHENTICATION SYSTEM ARCHITECTURE AND DESIGN

(71) Applicants: Phalguni Mukherjee, West Bengal (IN); Vipin Namboodiri, Bangalore (IN); Boppana Visweswara Rao, Bangalore (IN)

(72) Inventors: Phalguni Mukherjee, West Bengal (IN); Vipin Namboodiri, Bangalore (IN); Boppana Visweswara Rao, Bangalore (IN)

(73) Assignee: RICOH CO., LTD., Tokyo (JP)

( * ) Notice: Subject to any disclaimer, the term of this patent is extended or adjusted under 35 U.S.C. 154(b) by 35 days.

(21) Appl. No.: 14/639,713

(22) Filed: Mar. 5, 2015

(65) Prior Publication Data

US 2016/0259936 A1 Sep. 8, 2016

(51) Int. Cl.
*G06F 21/45* (2013.01)
*H04L 29/06* (2006.01)
*G06F 21/31* (2013.01)

(52) U.S. Cl.
CPC .............. *G06F 21/45* (2013.01); *G06F 21/31* (2013.01); *H04L 63/06* (2013.01); *H04L 63/061* (2013.01);
(Continued)

(58) Field of Classification Search
CPC ......... G06F 21/45; G06F 21/31; H04L 63/06; H04L 63/061; H04L 63/0815; H04L 63/083
(Continued)

(56) References Cited

U.S. PATENT DOCUMENTS

| 5,815,665 | A * | 9/1998 | Teper | G06Q 20/00 |
| | | | | 705/26.35 |
| 6,240,512 | B1 * | 5/2001 | Fang | H04L 63/0815 |
| | | | | 380/255 |

(Continued)

OTHER PUBLICATIONS

Kuppusamy et al.,"Two-Key Dependent Permutation for Use in Symmetric Cryptographic System", Hindawi Publishing Corporation, Mathematical Problem in Engineering, vol. 2014, Article ID 795292, 12 pages.*

(Continued)

*Primary Examiner* — Kambiz Zand
*Assistant Examiner* — Tongoc Tran
(74) *Attorney, Agent, or Firm* — Patent Law Works LLP

(57) ABSTRACT

A system and method that grants a token to authenticate a user requesting access to an application in a domain is disclosed. The method includes receiving a response from an identity (ID) provider in a second domain responsive to a first request from a user to access an application provided by an application server in a first domain, the response indicating the authenticity of the user in the second domain, randomly selecting a first key and a second key from a key store, generating a secret by randomly permuting the first key and the second key, generating a signature by signing user information associated with the user using the secret, generating an authentication token including the signature, determining whether the authentication token is valid, and responsive to determining that the authentication token is valid, granting access to the first application to the user based on the authentication token.

20 Claims, 16 Drawing Sheets

(52) U.S. Cl.
CPC ........ *H04L 63/083* (2013.01); *H04L 63/0815* (2013.01)

(58) Field of Classification Search
USPC ........................................................ 726/6
See application file for complete search history.

(56) References Cited

U.S. PATENT DOCUMENTS

| | | | | |
|---|---|---|---|---|
| 6,430,177 | B1* | 8/2002 | Luzeski | G06Q 10/107 370/356 |
| 7,590,550 | B2 | 9/2009 | Schoenberg | |
| 8,180,907 | B1* | 5/2012 | Seshadri | H04L 43/0817 709/203 |
| 2002/0144108 | A1* | 10/2002 | Benantar | H04L 63/0823 713/156 |
| 2004/0002878 | A1* | 1/2004 | Maria Hinton | G06Q 20/3821 705/76 |
| 2004/0030764 | A1* | 2/2004 | Birk | H04L 61/1523 709/223 |
| 2004/0128506 | A1* | 7/2004 | Blakley, III | H04L 63/0815 713/170 |
| 2004/0128541 | A1* | 7/2004 | Blakley, III | H04L 63/0815 726/9 |
| 2005/0015593 | A1* | 1/2005 | Cheng | H04L 63/0815 713/168 |
| 2005/0114701 | A1* | 5/2005 | Atkins | H04L 63/08 726/4 |
| 2005/0223217 | A1* | 10/2005 | Howard | G06F 21/31 713/155 |
| 2005/0277420 | A1* | 12/2005 | Shin | H04L 63/0815 455/442 |
| 2006/0021019 | A1* | 1/2006 | Hinton | G06F 21/41 726/10 |
| 2006/0123234 | A1* | 6/2006 | Schmidt | H04L 63/0209 713/168 |
| 2007/0184819 | A1* | 8/2007 | Barriga-Caceres | G06F 21/33 455/411 |
| 2012/0204032 | A1* | 8/2012 | Wilkins | H04L 9/006 713/170 |
| 2013/0231955 | A1* | 9/2013 | De Villiers | G06F 19/363 705/3 |
| 2014/0020078 | A1* | 1/2014 | Canning | H04L 63/0815 726/8 |
| 2014/0258708 | A1* | 9/2014 | Shekhar | H04L 9/0861 713/155 |
| 2016/0028538 | A1* | 1/2016 | Yoon | H04L 9/0861 380/44 |
| 2016/0380992 | A1* | 12/2016 | Boodman | G06F 21/335 726/7 |

OTHER PUBLICATIONS

Konstantinos D. Chronopoulos and Maria I. Gouseti "Resource Access Control in Social Networks" National and Kapodistrain University of Athens School of Science Faculty of Informatics and Telecommunications, dated Aug. 2012, 142 pages.

* cited by examiner

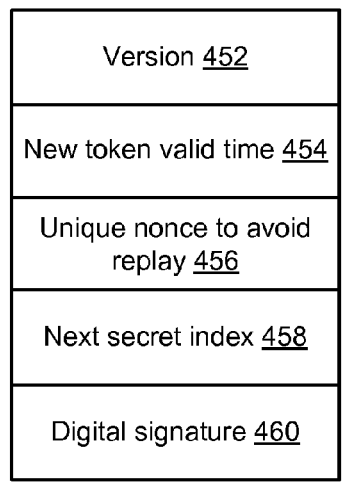
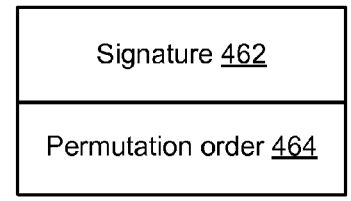
Figure 4C
Figure 4D
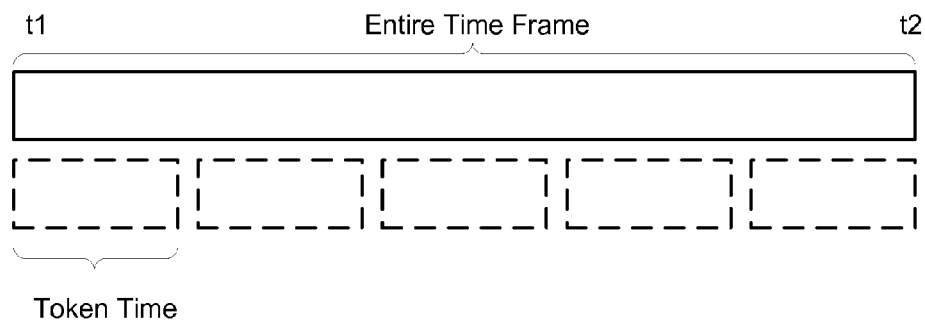
Figure 4E

BROKER-BASED AUTHENTICATION SYSTEM ARCHITECTURE AND DESIGN

BACKGROUND

Field of the Invention

The specification generally relates to a broker-based authentication system. In particular, the specification relates to a system and method for authenticating an internal system with an internal authentication mechanism based on certified responses from an external authentication system.

Description of the Background Art

Authentication is a major challenge when two vendors want to do business over a network since one party may not be ready to share their user credentials with the other party, or users may get annoyed when they have to maintain different sets of user credentials for different applications. For example, when a hospital tries to use a telemedicine system to serve remote patients provided by a third party vendor (e.g., a local clinic), two authentication issues need to be considered. First, the hospital system may not be willing to share crucial data such as employees' names, addresses, phone numbers, etc., with the third party vendor. Second, a doctor or a technician may not be ready to enter and remember multiple credentials for different systems (e.g., the hospital and the clinic). Therefore it is important to build an authentication system that can authenticate a user in one domain (e.g., a hospital domain) and give the user access to applications in another domain (e.g., a third party domain) without effecting the internal structure of an application (e.g., no sharing of any critical data).

Some current solutions include open single sign-on (OpenSSO) and federated identity such as security assertion markup language (SAML), OpenID, etc. However, these approaches have deficiencies. The cookie based "OpenSSO" approach fails when systems are located in multiple different domains since the cookie of one domain cannot be transferred to another domain. Also, OpenSSO is vendor specific, e.g., the OpenSSO solution for one vendor cannot be integrated to another vendor. Federated identity approaches may provide a more generalized solution compared to the OpenSSO. However, federated identity approaches are browser specific and are not capable of authenticating any session less system. There is a lack of a system that can authenticate both session less as well as session oriented system.

SUMMARY

The techniques introduced herein overcome the deficiencies and limitations of the prior art, at least in part, with a system and method for granting a token to authenticate a user requesting access to an application in a domain. In some embodiments, the system includes an authentication module and a broker. The authentication module is configured to receive a redirected response from an identity (ID) provider in a second domain responsive to a first request from a user to access an application provided by an application server in a first domain, the response indicating the authenticity of the user in the second domain. The authentication module is further configured to randomly select a first key and a second key from a key store. The authentication module is further configured to generate a secret by randomly permuting the first key and the second key. The authentication module is further configured to generate a signature by signing user information associated with the user using the secret. The authentication module is further configured to generate an authentication token including the signature. The broker at an application server is configured to determine whether the authentication token is valid. The broker at the application server is further configured to responsive to determining that the authentication token is valid, grant access to the first application to the user based on the authentication token.

Other aspects include corresponding methods, systems, apparatuses and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

FIG. 4C is a graphical representation of one embodiment of a refresh token.

FIG. 4D is a graphical representation of one embodiment of a digital signature included in a refresh token.

FIG. 4E is a graphical representation of one embodiment of time slots allotted to refresh tokens within a time frame.

DETAILED DESCRIPTION

Figure 1A:
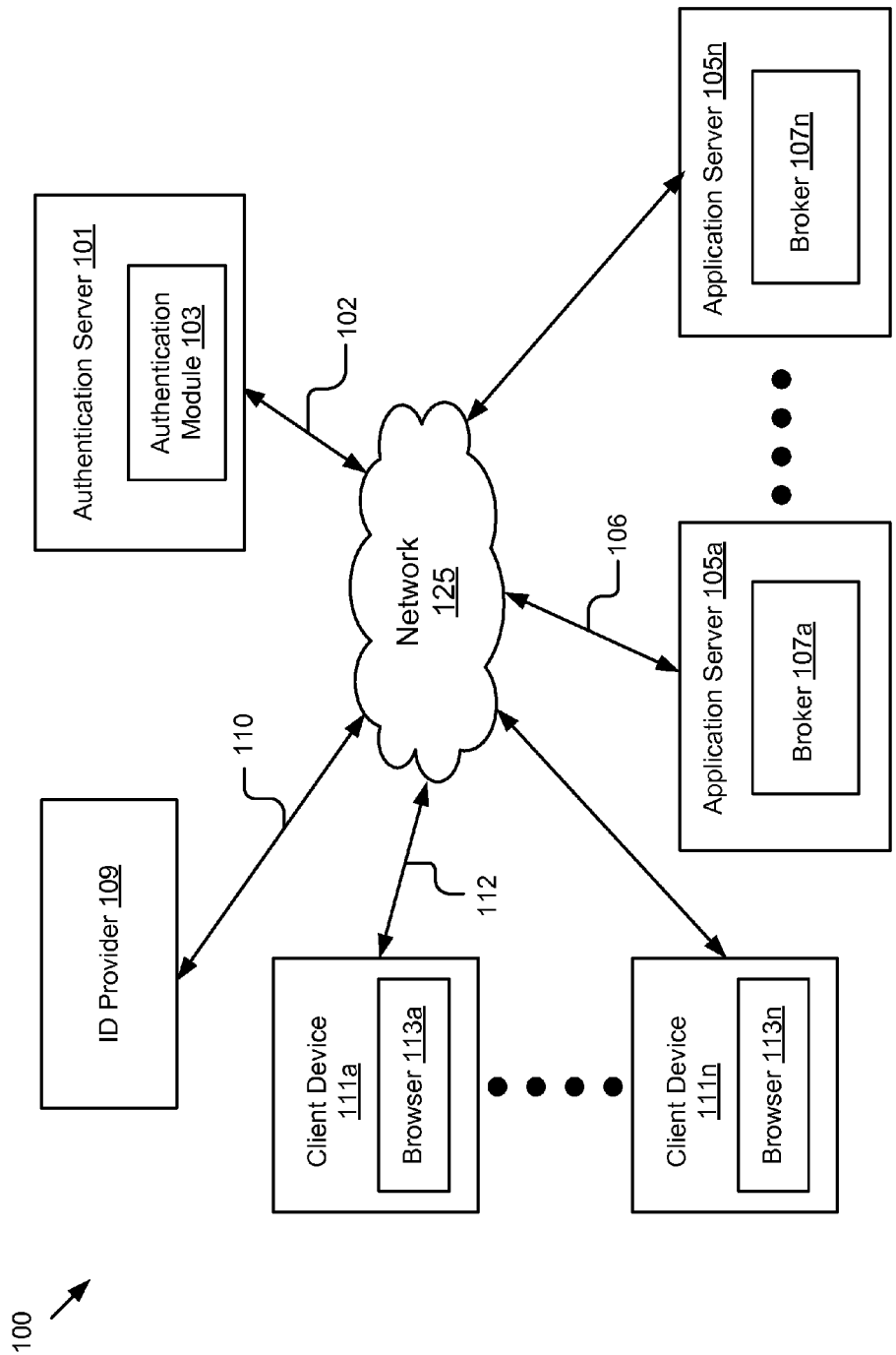
FIG. 1A is a high-level block diagram illustrating one embodiment of a system for granting a token to authenticate a user requesting access to an application in a domain.

FIG. 1A is a high-level block diagram illustrating one embodiment of a system 100 for granting a token to authenticate a user requesting access to an application in a domain. The illustrated system 100 may include an authentication server 101, an identity (ID) provider 109, one or more application servers 105a . . . 105n and one or more client devices 111a . . . 111n. In FIG. 1A and the remaining figures, a letter after a reference number, e.g., "105a," represents a reference to the element having that particular reference number. A reference number in the text without a following letter, e.g., "105," represents a general reference to instances of the element bearing that reference number. In the illustrated embodiment, these entities of the system 100 are communicatively coupled via a network 125.

The network 125 can be a conventional type, wired or wireless, and may have numerous different configurations including a star configuration, token ring configuration or other configurations. Furthermore, the network 125 may include a local area network (LAN), a wide area network (WAN) (e.g., the Internet), and/or other interconnected data paths across which multiple devices may communicate. Moreover, the network 125 may also include other active network elements such as switches, application delivery interfaces, load balancers, etc. In some embodiments, the network 125 may be a peer-to-peer network. The network 125 may also be coupled to or include portions of a telecommunications network for sending data in a variety of different communication protocols. In some embodiments, the network 125 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1A illustrates one network 125 coupled to the authentication server 101, the application server 105, the ID provider 109 and the client device 111, in practice one or more networks 125 can be connected to these entities.

In some embodiments, the authentication server 101, the application server 105, the ID provider 109 and the client device 111 exchange data among each other via the network 125. For example, the client device 111 sends a request to access an application provided by the application server 105 and receives a response from the application server 105 to allow the client device 111 to access the application. Although only a single authentication server 101 and a single ID provider 109 are shown in FIG. 1A, it should be understood that there may be any number of authentication servers 101 or ID providers 109.

In some embodiments, the authentication server 101, the application server 105 or the ID provider 109 may be either a hardware server, a software server, or a combination of software and hardware. The authentication server 101, the application server 105 or the ID provider 109 may be, or may be implemented by, a computing device including a processor, a memory, applications, a database, and network communication capabilities. The authentication server 101 is coupled to the network 125 via signal line 102. The application server 105a is coupled to the network 125 via signal line 106. The ID provider 109 is coupled to the network 125 via signal line 110. The clients are coupled to the network 125 via signal line 112.

In the example of FIG. 1A, the components of the authentication server 101 are configured to implement an authentication module 103 described in more detail below. In one embodiment, the authentication server 101 receives an authentication request for a user and authenticating the user. In one embodiment, the authentication server 101 communicates with the ID provider 109 to generate an authentication token for authenticating the user. In another embodiment, the authentication server 101 generates a refresh token for authenticating the user. The authentication token and the refresh token will be described in more detail below.

In some embodiments, the application server 105 provides and implements an application/service to a user responsive to receiving a request for accessing/obtaining the application/service from the user. In one example, the application server 105 is a web server that hosts a website and provides content of a webpage associated with the website to a user when the user requests the content through a browser on a client device. In another example, the application server 105 provides telemedicine applications including scheduling appointments, ordering and scheduling tests, obtaining results, referring patients to a provider, filling claims with insurance payers, prescribing and filling medications, etc.

In some embodiments, the application server 105 comprises a broker 107. For example, the application server 105a, 105n comprises a broker 107a, 107n, respectively. The broker 107 receives a request to access an application on the application server 105 from a user and transmits the request to the authentication server 101 for authenticating the user. The broker 107 receives an authentication token or a refresh token from the authentication server 101 for authenticating the user. The broker 107 determines whether the authentication token or the refresh token is valid and grants the user access to the application based on a valid token. The broker 107 will be described in more detail below.

The ID provider 109 provides one or more identifiers and security information for a user logging into the system 100 and requesting access to an application. An identifier identifies a user account. The identifier include a username, an email address, etc. The security information is used to verify the user account. The security information includes user credentials, challenges, user profile information, etc. The user credentials include a pair of username and password, a key pair (e.g., a public key and a private key), etc. The challenges include a set of questions related to the user holding the user account and a set of answers corresponding to the set of questions provided by the user when the user account was created. The user profile information associated with a user includes a name, an address, employment information, insurance information, etc. When a user tries to obtain data from an application server in a domain to which the ID provider 109 belongs, the ID provider 109 can use the identifiers and the security information to authenticate the user such that the authenticated user may access the application server. For example, a doctor can use his/her user credentials provided by the ID provider 109 to access his/her schedules stored on an application server. The application server and the ID provider 109 are in the same hospital domain.

In some embodiments, the ID provider 109 receives an authentication request for a user accessing an application on the application server 105 through the authentication server 101 and incorporates with the authentication server 101 to generate an authentication token to authenticate the user. In this scenario, the ID provider 109 and the application server 105 are in different domains. The ID provider 109 alone cannot authenticate the user.

The client device 111 may be a computing device that includes a memory and a processor, for example, a laptop computer, a desktop computer, a tablet computer, a smartphone, a personal digital assistant (PDA) or any other electronic device capable of accessing the network 125. The client device 111 sends a request to access an application on the application server 105 and receives a response from the application server 105 granting or denying the access to the application.

In some embodiments, the client device 111 comprises a browser 113. The browser 113 is used by a user accessing the client device 111 to view and transmit information. For example, a user sends a login request using the browser 113 to request access to an application on the application server 105. If the user needs to be get authenticated, at least one of the authentication server 101 and the ID provider 109 may communicate with the user via the browser 113 to obtain information related to authenticating the user. Depending on whether the authentication is successful, the browser 113 then displays, for the user, the content the user requests from the application server 105 or an error message indicating denial of access to the application server 105.

In some embodiments, the browser 113 is associated with or stores a token. For example, an authentication token or a refresh token is stored in a browser cache. The authentication server 101 generated an authentication token for a user when the user sent a login request for accessing a first application using the browser 113. The browser 113 stores this authentication token (e.g., in the form of a cookie). When the user requests access to a second application using the same browser 113, the user may access the second application without login again as long as (1) the authentication token stored in the browser 113 is valid, and (2) the first application and the second application are provided by application servers in a same domain. For example, a patient opened a webpage of a healthcare system using a browser and logged into the healthcare system to get his/her blood test result. A few minutes later when the authentication token stored in the browser is still valid, the patient may open a different webpage of the healthcare system using the same browser to schedule an appointment with a doctor without logging into the healthcare system again. In some embodiments, within a certain time frame after the authentication token expires, the browser 113 stores one or more refresh tokens that allow a user to access applications in the same domain without logging in again and again. Continuing the above example, in the 15 minutes after the authentication token became invalid, the patient may still access other applications if the healthcare system using the same browser based on one or more refresh tokens.

In some embodiments, at least one of the applications is representational state transfer (REST) based application, e.g., a session-less application. For example, the user sent a request to access a first application using a browser and got authenticated to access the first application (e.g., session-based) based on an authentication token or a refresh token. When the user sends a REST call for accessing a second REST based application (e.g., session-less) using the same browser, the authentication token or the refresh token is passed to the second application along with the request through the same browser. If the authentication token or the refresh token is valid, the user can access the second application.

The present specification describes a hybrid authentication system that benefits from both standard federated identity authentication approaches applied in an external domain authentication and token-based authentication approaches applied in an internal domain authentication. The system 100 in FIG. 1A depicts one or more domains. In some embodiments, the ID provider 109 belongs to a domain referred as an "external domain" and the application server 105 (e.g., 105a, 105n) belongs to a different domain referred as an "internal domain." The authentication server 101 works as a bridge between the external domain authentication and the internal domain authentication. When a user requests an application on the application server 105 in the internal domain via the browser 113 on the client device 111, there are two scenarios. In the first scenario (session-based), the request is passed to the ID provider 109 by the authentication serve 101 for authenticating the user. The ID provider 109 authenticates the user in the external domain using federated identity approaches (e.g., SAML, OpenSSO, etc.). Upon a successful authentication in the external domain, the authentication server 101 generates an authentication token to authenticate the user in the internal domain. As a result, the user can access the application from the application server 105 in the internal domain. The tokens are also stored as cookies in the browser for use in session-less cases. Usually the federated identity approaches are browser specific and are not capable of authenticating a session-less system. However, the present specification applies to both a session-based system and a session-less system. In the second scenario (session-less), an authentication token or a refresh token has already been generated responsive to a previous request to access an application in the internal domain. As noted above, the token has also been stored as cookie in the browser 113. When receiving a subsequent request (e.g., a later request to access the application or a later request to access another application in the internal domain), the browser 113 sends uses the previously generated token or generates a new refresh token to authenticate the user. For example, when the user wants to access other applications or services in the internal domain, the tokens are passed to these other applications or services as cookies since they are readily available in the browser 113 cache. In this way, the user is authenticated inside the internal domain without reaching out to the external domain.

Figure 1B:
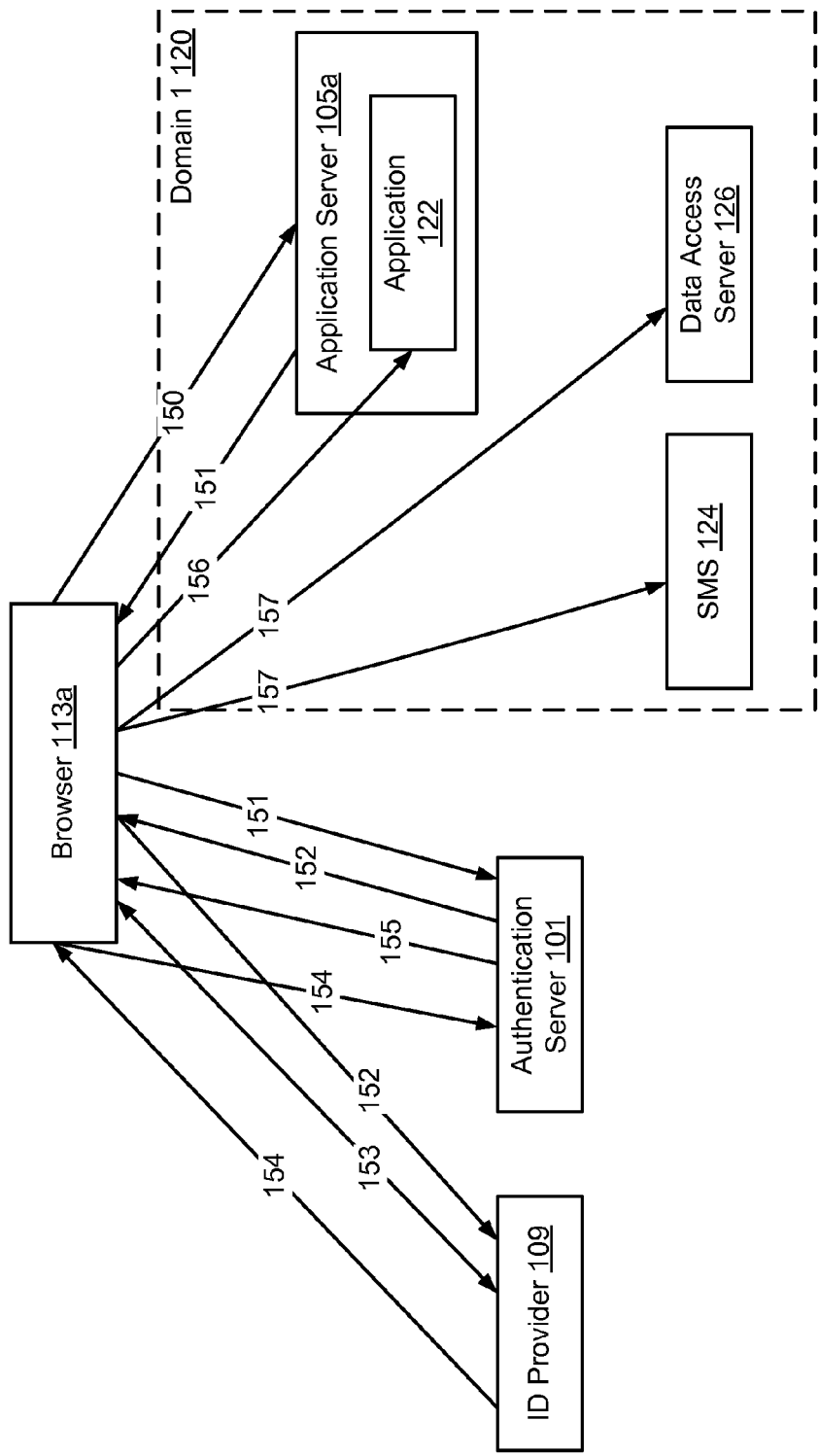
FIG. 1B is a block diagram illustrating one embodiment of communication for granting a token to authenticate a user requesting access to an application in a domain and sessionless access.

Referring now also to FIG. 1B, example communication for granting a token to authenticate a user requesting access to an application in a domain (session-based) and session-less is described. In the first scenario (session-based), the authentication server 101 communicates with the ID provider 109 to generate an authentication token for authenticating a user. The user sends 150 a request (e.g., a login request) to access an application 122 using the browser 113 on the client device 111. The broker 107 on the application server 105 receives the request and redirects 151 the request to the authentication server 101. The application server 105 is in a first domain 120. The authentication module 103 on the authentication server 101 receives the request and determines whether any authenticated session based on a previous request exists. If the authentication server request session is already authenticated based on one or more previous login requests for other applications, then the authentication module 103 redirects a response along with the authentication token that was generated based on previous requests back to the application server in the first domain 120. If no authenticated session is present, the authentication module 103 determines that the user is not authenticated and needs to be authenticated. The authentication module 103 then redirects 152 the request to the ID provider 109 to ask for help from the ID provider 109 to authenticate the user. The ID provider 109 may be a third-party server in a second domain different from the first domain 120 to which the application server 105 belongs. Responsive to receiving the request, the third-party ID provider 109 generates and sends 153 challenges to the user. The user receives and responds to the challenges using the browser 113. The third-party ID provider 109 determines that the user successfully passes the challenges. The third-party ID provider 109 responds to the authentication module 103 with a notification 154 (e.g. provides a certificate for the authenticated user) that the user is an authenticated user in the second domain to which the ID provider 109 belongs. The authenticated user in the second domain can access any applications in the second domain. In some embodiments, the ID provider 109 notifies the authentication server 101 through a redirect 154 with a browser 113. As soon as the authentication module 103 of the authentication server 101 knows that the user is authenticated in the second domain, the authentication module 103 of the authentication server 101 authenticates the user via the token approach of the present invention. In particular, a token is sent 155 to the browser 113 and the token is set or stored as a cookie in the browser 113. In some embodiments, the authentication module 103 of the authentication server 101 determines whether a user role associated with the user is present in the first domain and generates an authentication token for the user if such role exists. The user role describes what role the user has in applications in the first domain. The broker 107 of the application server 105 receives 156 the authentication token and determines whether the authentication token is valid. If valid, the broker 107 grants the user access to the application 122.

Suppose the system 100 is a health system where at least one application server 105 is in a healthcare domain and the ID provider 109 is in a hospital domain. When a doctor working in a hospital is registered on the system 100, the ID provider 109 creates a user account and produces challenges for the doctor. Later when the doctor logs into the system 100 to obtain a test result of a patient stored on the application server 105a in the healthcare domain, the ID provider 109 first determines whether the doctor can access the hospital domain based on the user account and the challenges. Upon knowing that the doctor can access the hospital domain from the ID provider 109, the authentication server 101 determines that there is a user role associated with the doctor in the healthcare domain and generates an authentication token for the doctor to obtain the test result from the application server 105a in the health domain.

In the second scenario (session-less), an authentication token or a refresh token was already generated for a user responsive to a previous request from the user for accessing an application as has been described above. The token has also been set or stored as a cookie in the browser 113. When receiving a subsequent authentication request for the user, the authentication server 101 alone can authenticate the user without communicating with the ID provider 109 again. In some embodiments, the application server 105 receives a request to access an application from a user using a browser 113 and grants access to the application to the user based on an authentication token or a refresh token generated for the user. The application server 105 then receives a subsequent request to access the application from the user via the same browser 113. In some embodiments, the subsequent request is a later request to access the same application from the user using the browser 113 after authentication of the previous request. In other embodiments, the subsequent request (session-less) is for requesting a different application on a different application server (e.g., other session-less servers such as SMS 124 or data access server 126) in the same domain using the same browser 113. In some embodiment, the system 100 provides separation of patient profile information from the patient medical data. The patient medical data does not contain any data that can uniquely identify a patient thereby making it more robust to loss in sensitive information in case of attacks. This information can be stored in the session-less servers 124, 126 in such a separated manner. The session-less servers 124, 126 then determines whether the authentication token or the refresh token, which was previously generated responsive to the previous request, exists as a cookie stored in the browser 113 cache. For example, when the user wants to access the session-less servers 124, 126, the tokens are passed 157 as cookies to these session-less servers 124, 126 or services. If the cookies do not exist, access is denied. If the cookie exists, the broker 107 at the session-less servers 124, 126 then determines whether the authentication token or the refresh token is valid. If the previously generated token is valid, the session-less servers 124, 126 grants the user access to the application responsive to the subsequent request. However, if the previously generated token is invalid, the application server 105 initiates a refresh token request and redirects the request to the authentication server 101 for requesting a new refresh token. Responsive to receiving the refresh token request, the authentication server 101 grants a new refresh token and redirects the refresh token request along with the refresh token back to the application server 105. The application server 105 receives the refresh token and validates the refresh token. With the valid refresh token, the application server 105 grants the access to the application to the user responsive to the subsequent request.

Considering the example described above, the doctor logged in the system 100 and obtained a test result of a patient stored on the application server 105a. Now the doctor wants to access the application server 105n to send a message to the patient (e.g., to explain the test result or to schedule a follow-up test). If (1) the doctor uses the same browser to obtain the test result and to send the message, (2) the application server 105a and the application server 105n are in the same domain and (3) an authentication token or a refresh token is valid, where the token was previously generated for the doctor responsive to the request for the test result, the doctor may send the message to the patient right away. If (1) and (2) are satisfied, but (3) is not satisfied, the application server 105n generates a request for a refresh token for the doctor. The doctor may still send the message to the patient after the refresh token is determined to be valid at the application server 105n.

Figure 2A:
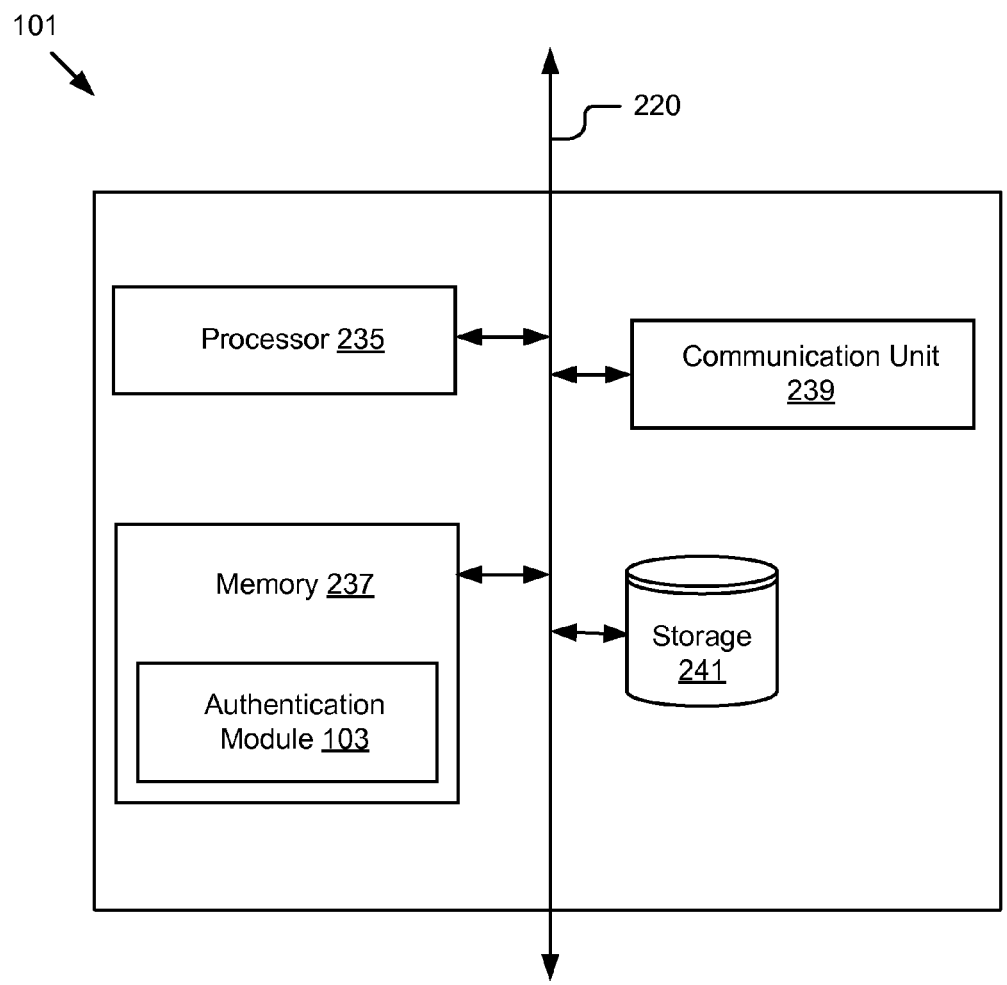
FIG. 2A is a block diagram illustrating one embodiment of an authentication server.

FIG. 2A is a block diagram illustrating one embodiment of an authentication server 101 including an authentication module 103. The authentication server 101 may also include a processor 235, a memory 237, a communication unit 239 and storage 241 according to some examples. The components of the authentication server 101 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, transmitting authentication information, performing complex tasks including various types of generating and validating an authentication token or a refresh token, etc. In some implementations, the processor 235 may be coupled to the memory 237 via the bus 220 to access data and instructions therefrom and store data therein. The bus 220 may couple the processor 235 to the other components of the authentication server 101 including, for example, the memory 237, the communication unit 239, the authentication module 103, and the storage 241. It will be apparent to one skilled in the art that other processors, operating systems, sensors, displays and physical configurations are possible.

The memory 237 may store and provide access to data for other components of the authentication server 101. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the authentication module 103. The memory 237 is also capable of storing other instructions and data, including, for example, an operating system, hardware drivers, other software applications, databases, etc. The memory 237 may be coupled to the bus 220 for communication with the processor 235 and the other components of the authentication server 101.

The memory 237 may include one or more non-transitory computer-usable (e.g., readable, writeable) device, a static random access memory (SRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-Ray™, etc.). It should be understood that the memory 237 may be a single device or may include multiple types of devices and configurations.

The communication unit 239 is hardware for receiving and transmitting data by linking the processor 235 to the network 125 and other processing systems. The communication unit 239 receives data such as requests from the application server 105 and transmits the requests to the controller 201, for example a request to authenticate a user attempting to access an application on the application server 105. The communication unit 239 also transmits information including an authentication token to the application server 105 for granting access to the user, for example, in response to the request to authentication the user. The communication unit 239 is coupled to the bus 220. In one embodiment, the communication unit 239 may include a port for direct physical connection to the application server 105, the ID provider 109, the client device 111 or to another communication channel. For example, the communication unit 239 may include an RJ45 port or similar port for wired communication with the client device 111. In another embodiment, the communication unit 239 may include a wireless transceiver (not shown) for exchanging data with the application server 105, the ID provider 109, the client device 111 or any other communication channel using one or more wireless communication methods, such as IEEE 802.11, IEEE 802.16, Bluetooth® or another suitable wireless communication method.

In yet another embodiment, the communication unit 239 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 239 may include a wired port and a wireless transceiver. The communication unit 239 also provides other conventional connections to the network 125 for distribution of files and/or media objects using standard network protocols such as TCP/IP, HTTP, HTTPS and SMTP as will be understood to those skilled in the art.

The storage 241 is a non-transitory memory that stores data for providing the functionality described herein. The storage 241 may be a dynamic random access memory (DRAM) device, a static random access memory (SRAM) device, flash memory or some other memory devices. In some embodiments, the storage 241 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated embodiment, the storage 241 is communicatively coupled to the bus 220. The storage 241 stores data for authenticating a user and other functionality as described herein. For example, the storage 241 may store an authentication token and associated data (e.g., a time frame). The time frame is assigned by the third-party ID provider 109 and identifies the maximum time length that a user can access an application based on the authentication token.

The authentication module 103 may include software and/or logic to provide the functionality for authenticating a user responsive to receiving an authentication request. In some embodiments, the authentication module 103 can be implemented using programmable or specialized hardware, such as a field-programmable gate array (FPGA) or an application-specific integrated circuit (ASIC). In some embodiments, the authentication module 103 can be implemented using a combination of hardware and software.

Figure 2B:
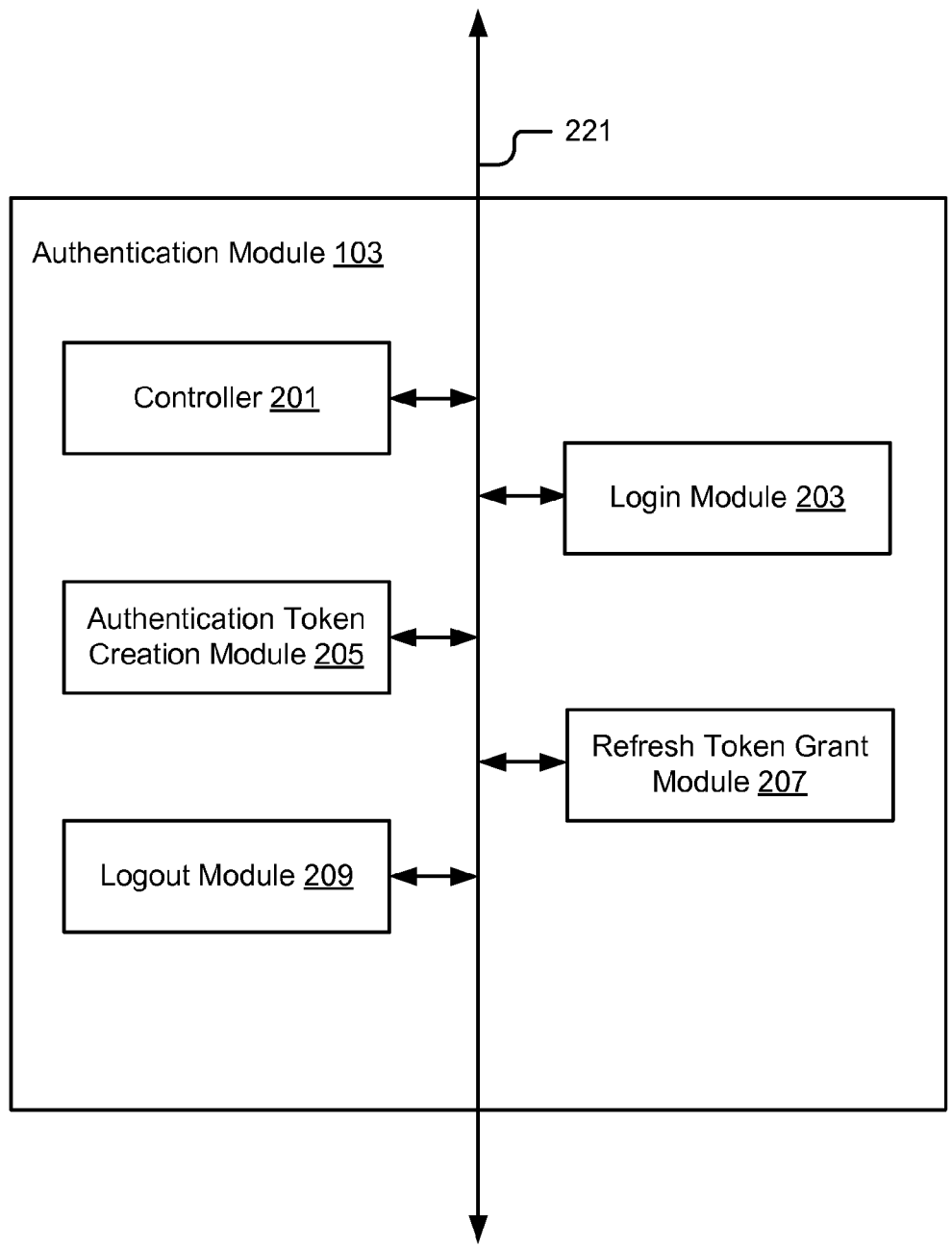
FIG. 2B is a block diagram illustrating one embodiment of an authentication module on an authentication server.

FIG. 2B is a block diagram illustrating one embodiment of an authentication module 103 on an authentication server 101. In some embodiments, the authentication module 103 may include a controller 201, a login module 203, an authentication token creation module 205, a refresh token grant module 207 and a logout module 209. The components of the authentication module 103 are communicatively coupled via the bus 221.

The controller 201 may include software and/or logic to control the operation of the other components of the authentication module 103. The controller 201 controls the other components of the authentication module 103 to perform the methods described below with reference to FIGS. 5-9 and 11. The controller 201 may also include software and/or logic to provide the functionality for handling communications between the authentication module 103 and other components of the authentication server 101 as well as between the components of the authentication module 103. In some embodiments, the controller 201 can be implemented using programmable or specialized hardware including a field-programmable gate array (FPGA) or an application-specific integrated circuit (ASIC). In some embodiments, the controller 201 can be implemented using a combination of hardware and software executable by processor 235. In some embodiments, the controller 201 is a set of instructions executable by the processor 235. In some implementations, the controller 201 is stored in the memory 237 and is accessible and executable by the processor 235. In some implementations, the controller 201 is adapted for cooperation and communication with the processor 235, the memory 237 and other components of the authentication module 103 via the bus 221.

In some embodiments, the controller 201 sends and receives data, via the communication unit 239, to and from one or more of the application server 105, the ID provider 109 and the client device 111. For example, the controller 201 receives, via the communication unit 239, a request of a user accessing an application from the application server 105 and sends an authentication token or a refresh token to the application server 105 to grant or deny the access to the application for the user.

In some embodiments, the controller 201 receives data from other components of the authentication module 103 and stores the data in the storage 241. For example, the controller 201 receives an authentication token from the authentication token creation module 205 and stores the authentication token in the storage 241. In other embodiments, the controller 201 retrieves data from the storage 241 and sends the data to other components of the authentication module 103. For example, the controller 201 retrieves, from the storage 241, a time frame that identifies a maximum time length that a user can access an application based on an authentication token, and sends the retrieved time frame to the refresh token grant module 207.

The login module 203 may include software and/or logic to provide the functionality for processing a login request received from the application server 105. In some embodiments, the login module 203 can be implemented using programmable or specialized hardware including a field-programmable gate array (FPGA) or an application-specific integrated circuit (ASIC). In some embodiments, the login module 203 can be implemented using a combination of hardware and software executable by processor 235. In some embodiments, the login module 203 is a set of instructions executable by the processor 235. In some implementations, the login module 203 is stored in the memory 237 and is accessible and executable by the processor 235. In some implementations, the login module 203 is adapted for cooperation and communication with the processor 235, the memory 237 and other components of the authentication module 103 via the bus 220.

The login module 203 receives, from the broker 107 on the application server 105, a login request for a user accessing an application on the application server 105 via the communication unit 239 and the controller 201. The login module 203 determines that the user needs to be authenticated and sends the request to an appropriate module or server for authenticating the user. For example, responsive to receiving a request for a pharmacist requesting a prescription of a patient, the login module 203 determines that the pharmacist needs to be authenticated to obtain the prescription and determines where to forward the request for authenticating the pharmacist.

The login module 203 chooses an appropriate module or server to forward a request depending on whether the request is a fresh request. When a user requests an application from one of the application servers 105 in an internal domain for the first time, this request is a fresh request. For example, a doctor logs into the system 100 to send a first request to check the schedule of the day and to send a second request to retrieve patient records. The login module 203 receives the two requests from the one or more application servers 105 in the internal domain and determines that the first request to check the schedule is a refresh request. Within a certain time interval after the refresh request, the login module 203 may also receive one or more requests for accessing applications from the application servers 105 in the same internal domain. The one or more requests are subsequent requests. In the above example, the second request to retrieve patient records may be a subsequent request. In some embodiments, the login module 203 receives the refresh request and the subsequent request in the same session. A user sent the refresh request and the subsequent request via the same browser.

In some embodiments, the login module 203 determines that the received request is a fresh request and sends the fresh request to the ID provider 109. The fresh request is a login request from a user for accessing one of the application servers 105a, 105n in an internal domain (e.g., a first domain). The login module 203 sends this fresh request to the ID provider 109. The ID provider is in an external domain (e.g., a second domain). The ID provider 109 uses a federated authentication approach (e.g., SAML, Open ID) to determine whether the user is an authenticated user in the external domain. For example, the ID provider 109 compares the user credentials provided by the user in the request with the stored user credentials. If the user credentials match, the ID provider 109 determines that the user is authenticated in the external domain. As a result, the user can access applications in the external domain using the credentials. The ID provider 109 then redirects a response to the login module 203. The response notifies the login module 203 that the user is authenticated in the external domain. Upon this notification, the login module 203 sends the request to the authentication token creation module 205 to authenticate the user in the internal domain. It should be understood that the present invention is particularly advantageous because generating the authentication token including the signature is independent from an authentication scheme utilized by the identity provider. More specifically, the present invention implements a token architecture with a system and its constituent services that make it immune to changes to the authentication scheme used by the ID provider 109. The present invention works whether the ID provider 109 is based on SAML, OpenID or any other standard.

In other embodiments, when receiving a subsequent request for a user accessing applications in an internal domain, the login module 203 communicates with the broker 107 on the application server 105 to authenticate the user. Upon receiving the subsequent request, the broker 107 determines whether a previous token is valid. The previous token was generated based on a fresh request or a subsequent request received before the current subsequent request. The broker 107 then uses either the valid previously generated token or a new refresh token (generated based on the current subsequent request) to grant the user access to the application server 105.

In some embodiments, the ID provider 109 in the external domain creates, updates and stores user login information (e.g., user accounts, user credentials, etc.) in a third party database (not shown). A user may use such user login information to access applications in the internal domain while the application server 105 in the internal domain does not store the user login information in an internal database. The user may log into the system 100 from the external domain side or from the internal domain side. For example, the ID provider 109 creates a "TECHNICIAN" account for a user. When the user successfully logins as "TECHNICIAN" in the external domain, the "TECHNICIAN" is able to create login information for new patients. The new patients may get authenticated based on the login information and may access applications in the internal domain. The new patients may log into the system 100 from the internal domain. The login information of the "TECHNICIAN" and the new patients are only stored in the ID provider 109. This architecture, which restricts processing of user login information in the external domain, is particularly advantageous because it is able to separate out the concern of login and creation of new patients from applications in the internal domain, while at the same time give access to applications in the internal domain. For example, the ID provider 109 creates and stores patient profile information (e.g., patient names, addresses, insurance information) and credentials. The application server 105 stores patient records (e.g., test results). The ID provider 109 and the application server 105 uses an index to correspond a patient to a patient record. When a user accesses the patient records, the ID provider 109 determines that the patient is associated with index N and the application server 105 retrieves the $N^{th}$ patient record using the index N to present to the user. The application server 105 is therefore anonymous. Even if the application server 105 is attacked, the profile information of patients are still safe and thereby anonymity of patients is not compromised.

The authentication token creation module 205 may include software and/or logic for generating an authentication token. In some embodiments, the authentication token creation module 205 can be implemented using programmable or specialized hardware including a field-programmable gate array (FPGA) or an application-specific integrated circuit (ASIC). In some embodiments, the authentication token creation module 205 can be implemented using a combination of hardware and software executable by processor 235. In some embodiments, the authentication token creation module 205 is a set of instructions executable by the processor 235. In some implementations, the authentication token creation module 205 is stored in the memory 237 and is accessible and executable by the processor 235. In some implementations, the authentication token creation module 205 is adapted for cooperation and communication with the processor 235, the memory 237 and other components of the authentication module 103 via the bus 221.

In some embodiments, the login module 203 receives a fresh request for a user accessing an application provided by the application server 105 in an internal domain and sends the fresh request to the ID provider 109 in an external domain to authenticate the user in the external domain. The login module 203 receives a notification that the user is authenticated in the external domain from the ID provider 109 and sends the fresh request to the authentication token creation module 205. The authentication token creation module 205 generates an authentication token to authenticate the user in the internal domain.

The authentication token creation module 205 determines whether to generate an authentication token based on whether there is a user role associated with the user in the internal domain. The user roles defines which use cases the user needs to be mapped, for example, a user with role doctor, can see only doctor specific interfaces, while a nurse can see only nurse specific interfaces, etc. The user role may be assigned by an administrator of the application server 105. If the user role associated with the user in the internal domain is present, the authentication token creation module 205 generates an authentication token and sends the authentication token to the broker 107. The broker 107 determines whether to grant the user access to the requested application based on the authentication token. If the user role associated with the user in the internal domain is absent, the authentication token creation module 205 notifies the broker 107 to deny access to the requested application to the user.

In some embodiments, the authentication token creation module 205 creates a secret and then uses the secret to generate a signature included in an authentication token. In some embodiments, the secret is a 256-bit key. The authentication token creation module 205 determines a key store that includes a set of keys, randomly selects a first 128-bit key and a second 128-bit key from the set of keys in the key store, and then applies random permutation to the two selected 128-bit keys to create a 256-bit key as the secret. In some embodiments, the authentication token creation module 205 breaks the first and second 128-bit keys to four 64-bit keys, randomly selects a permutation order and creates a 256-bit key as the secret by permuting the four 64-bit keys using the permutation order.

Once the secret was created, the authentication token creation module 205 generates a signature by signing user information associated with the user using the secret. The user information may include a user role, a user name, a user ID, etc. The authentication token creation module 205 may use a secure hash algorithm (e.g., SHA-256) to generate the signature. The authentication token creation module 205 generates the authentication token that includes the signature and other information (e.g., a version of the key store, key indexes used to select the first and second 128-bit keys from the key store, etc.) An example authentication token will be described below with reference to FIGS. 4A and 4B.

The authentication token creation module 205 shares the secret with the broker 107 in the form of a key store. The broker 107 on the application server 105 determines whether an authentication token is valid based at least in part on the information of the secret and the key store. The validation process will be described in more detail below with reference to FIG. 3B. In some embodiments, the authentication token creation module 205 exchanges the secret with the broker 107 or any other trusted group using a two-way transport layer security (TLS) protocol.

The broker 107 on the application server 105 receives a request to access an application on the application server 105 from a user and then determines whether there is any information about a key store. In some embodiments, this request may be a fresh request after application server 105 started, the authentication token creation module 205 has not yet shared any secret with the broker 107 and the broker 107 contains no key store information. The broker 107 therefore sends a request to the authentication token creation module 205 for key store information. The authentication token creation module 205 determines a key store and sends the information of the key store to the broker 107 securely through a two-way TLS. In other embodiments, the broker 107 has already stored key store information because of the authenticated session based on one or more previous requests.

Once key store information has been stored in the broker 107, the broker 107 determines whether the stored key store information is the latest information. The broker 107 determines a version of the stored key store. The broker 107 also receives version information about the key store from the authentication server 101. For example, the authentication server 101 changes the version of the key store and notifies the broker 107 of the latest version. The broker 107 determines whether the version present at the broker 107 is consistent with the received version. Different versions of the key store include different sets of keys.

If the two versions are inconsistent, the broker 107 sends a request for the latest key store information to the authentication server 101. Responsive the request, the authentication server 101 sends the key store information to the broker 107. The broker 107 then updates the key store information and grants access of the application to the user based on the key store information and a token. The token could be a previously generated authentication token, a previously generated refresh token or a new refresh token. The two-way TLS ensures that a version of the key store at the broker 107 is consistent with the version of the key store at the authentication server 101. A correct version of the key store at the broker 107 is critical for token validation.

The refresh token grant module 207 may include software and/or logic for granting a refresh token responsive to receiving a refresh token request. In some embodiments, the refresh token grant module 207 can be implemented using programmable or specialized hardware including a field-programmable gate array (FPGA) or an application-specific integrated circuit (ASIC). In some embodiments, the refresh token grant module 207 can be implemented using a combination of hardware and software executable by processor 235. In some embodiments, the refresh token grant module 207 is a set of instructions executable by the processor 235. In some implementations, the refresh token grant module 207 is stored in the memory 237 and is accessible and executable by the processor 235. In some implementations, the refresh token grant module 207 is adapted for cooperation and communication with the processor 235, the memory 237 and other components of the authentication module 103 via the bus 221.

The login module 203 receives a request for accessing an application provided by the application server 105 in an internal domain. If the login module 203 determines that the request is a subsequent request from the user using the same browser, the login module 203 communicates with the broker 107. The broker 107 determines whether to generate a refresh token request based on determining whether a previously generated token is valid and can be used to authenticate the user. If the refresh token grant module 207 receives a refresh token request from the broker 107, the refresh token grant module 207 determines whether to grant a refresh token. If yes, the refresh token grant module 207 generates the refresh token such that the user may access an application requested in the current subsequent request.

The refresh token grant module 207 determines whether to grant a refresh token based on whether a time slot allotted to a refresh token is available. In some embodiments, responsive to receiving a fresh request for accessing an application in an internal domain via a browser, the ID provider 109 not only instructs the authentication token creation module 205 to generate an authentication token but also assigns a time frame associated with the authentication token. The time frame identifies a total amount of time within which the user can access one or more applications in the internal domain based on the authentication token. The refresh token grant module 207 receives this time frame and divides the time frame to N time slots. N is a positive integer. A time slot is a valid time for a refresh token. Later when a user, using the same browser, initiates a subsequent request for accessing an application in the internal domain, the broker 107 receives the subsequent request and determines to generate a refresh token request. Responsive to receiving the refresh token request, the refresh token grant module 207 determines whether the receiving time is within any of N slots. If yes, the refresh token grant module 207 determines an available time slot and generates a refresh token based on allotting the determined time slot to the refresh token. This allotted time associated with the refresh token is later used by the broker 107 to determine whether the refresh token is valid. If no, the refresh token grant module 207 determines all N time slots of the time frame have been used up and will not generate a refresh token. Instead, the refresh token grant module 207 notifies the authentication token creation module 205 that the time frame associated with the authentication token expires and a new authentication token is needed. The authentication token creation module 205 then generate a new authentication token based on treating the subsequent token as a fresh token.

Referring now to FIG. 4E, an example of a time frame that is allotted to refresh tokens is shown. The ID provider 109 assigns the time frame ranging between t1 and t2. The time frame t2−t1 identifies the total valid time that a user can access one or more applications in an internal domain based on an authentication token. The refresh token grant module 207 divides the time frame t2−t1 to N time slots depicted in dashed boxes. In the example of FIG. 4E, N equals to five. A time slot is a valid token time for a refresh token. Usually, the refresh token grant module 207 allots the first time slot (e.g., the first dashed box) to a first refresh token responsive to receiving the first refresh token request, allots the second time slot (e.g., the second dashed box) to a second refresh token responsive to receiving the second refresh token request, and so on. When receiving a refresh token request, the refresh token grant module 207 determines that the first n slots (n<N) have been used for the first n refresh tokens and generates a refresh token by allotting the n+1 slot to the new fresh token. If the last slot (the $N^{th}$ slot) has been used, the refresh token grant module 207 determines that the time frame t2−t1 expires without generating a new refresh token.

In one example, a doctor opens a webpage using a browser to send a first request (e.g., a refresh request) to access a patient record in a healthcare domain. The doctor obtains access to the patient record based on an authentication token. The ID provider 109 determines a 30-minute window associated with the authentication token such that the doctor can access applications in the healthcare domain, for example, access the patient record, send a message to a patient, refer the patient, write a prescription, etc. When the doctor opens a different webpage in the browser to write a prescription for a first patient at the 11$^{th}$ minute, the refresh token grant module 207 determines an available slot and generates a new refresh token that may allow the doctor to complete the prescription. When the doctor opens another webpage in the browser to send a message to a second patient at the 34$^{th}$ minute, the refresh token grant module 207 determines not to generate a refresh token since no time slot is available at 34$^{th}$ minute and notifies the authentication token creation module 205 to generate a new authentication token to allow the doctor to send the message.

In some embodiments, the refresh token grant module 207 generates a refresh token in a similar way that the authentication token creation module 205 generates an authentication token, e.g., creating a secret based on randomly selected keys, generating a signature based on the secret and generates the refresh token including the signature and other information. In some embodiments, a previously generated token, e.g., an authentication token or a previous refresh token generated based on a previous request, includes index information that can be used in generating a next refresh token. The refresh token grant module 207 retrieves indexes from the previously generated token, selects keys from the key store using the retrieved indexes and generates a new refresh token based on the selected keys. An example refresh token will be described below with reference to FIGS. 4C and 4D.

The logout module 209 may include software and/or logic to provide the functionality for processing a logout request. In some embodiments, the logout module 209 can be implemented using programmable or specialized hardware including a field-programmable gate array (FPGA) or an application-specific integrated circuit (ASIC). In some embodiments, the logout module 209 can be implemented using a combination of hardware and software executable by processor 235. In some embodiments, the logout module 209 is a set of instructions executable by the processor 235. In some implementations, the logout module 209 is stored in the memory 237 and is accessible and executable by the processor 235. In some implementations, the logout module 209 is adapted for cooperation and communication with the processor 235, the memory 237 and other components of the authentication module 103 via the bus 221.

The logout module 209 supports single sign out when receiving a logout request from a user, e.g., if the user wants to log out of one application, the logout module 209 will also log out the user from all other applications that the user is currently logged in. In some embodiments, the logout module 209 receives a logout request from a user through the broker 107 on the application server 105 (e.g., from the internal domain). The logout module 209 notifies the ID provider 109 of the logout request. At the same time, the logout module 209 notifies (e.g., in a back channel way) all other applications where the user has logged in. As a result, the user also logs out from other application servers providing the other applications. For example, a nurse is currently logging in the application server 105a and 105n in a healthcare domain through a browser 113 on the client device 111 based on login information stored in the ID provider 109. The nurse obtained patient records from 105a and scheduled an appointment with a patient through the scheduling application provided by 105n. The nurse sent a request to log out from 105a by closing the browser. Responsive to the request, the logout module 209 notifies the ID provider of the request and incorporates with the 105a, 105n to log out the nurse from both servers.

In other embodiments, the ID provider 109 first receives a logout request from a user. The ID provider 109 communicates with the logout module 209 on the authentication server 101 by passing a unique identity provider (IDP) handle to the logout module 209 through a back channel communication. The unique IDP handle is used for secured communication. The logout module 209 then determines, with reference to this handle, all the application servers that the user is currently logged in and notifies all the application servers (e.g., in a back channel way) to log out the user.

Figure 3A:
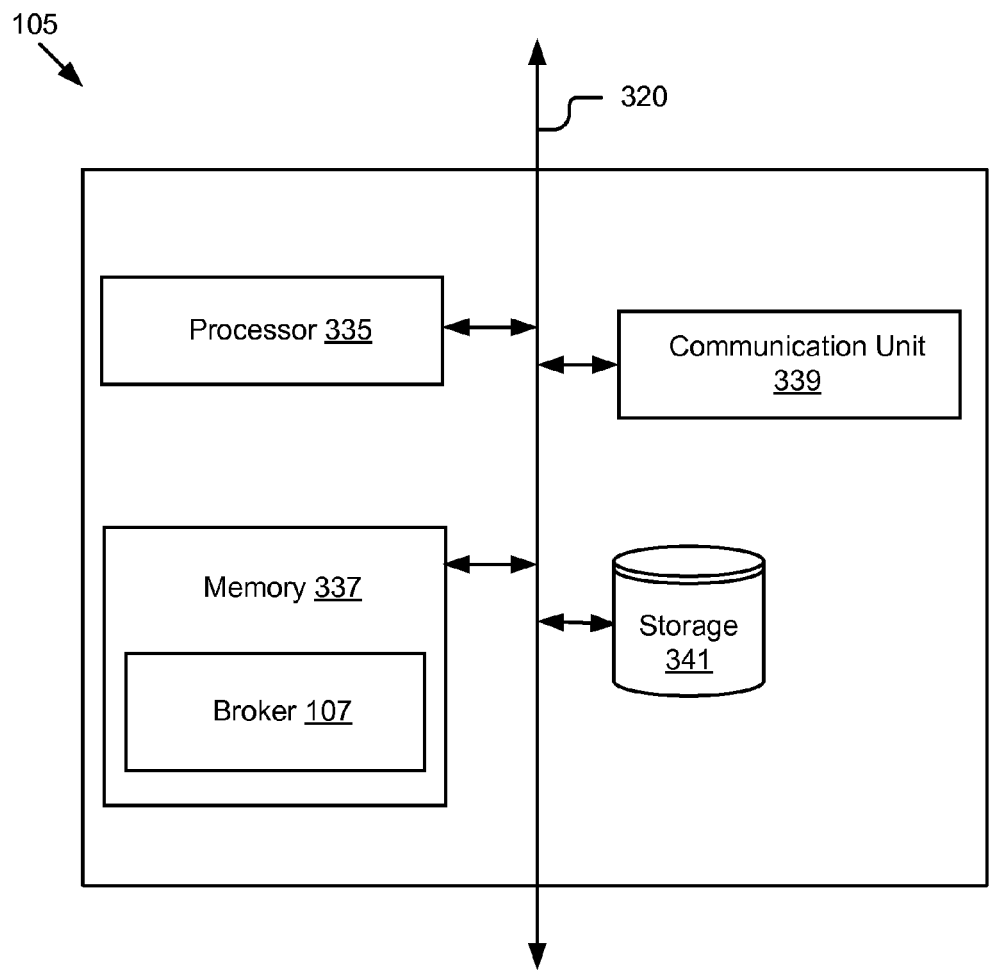
FIG. 3A is a block diagram illustrating one embodiment of an application server.

FIG. 3A is a block diagram illustrating one embodiment of an application server 105 including a processor 335, a memory 337, a communication unit 339, storage 341 and a broker 107 according to some examples. The components of the application server 105 are communicatively coupled by a bus 320. The bus 320 may represent one or more buses including an industry standard architecture (ISA) bus, a peripheral component interconnect (PCI) bus, a universal serial bus (USB), or some other bus known in the art to provide similar functionality. The broker 107 may include software and/or logic to provide the functionality for authenticating a user responsive to receiving an authentication request. In some embodiments, the broker 107 can be implemented using programmable or specialized hardware, such as a field-programmable gate array (FPGA) or an application-specific integrated circuit (ASIC). In some embodiments, the broker 107 can be implemented using a combination of hardware and software.

Those skilled in the art will recognize that some of the components of the application server 105 have the same or similar functionality to the components of the authentication server 101 so descriptions of these components will not be repeated here. For example, the processor 335, the memory 337, the communication unit 339, the storage 341 have a similar functionality to the processor 235, the memory 237, the communication unit 239 and the storage 241 of FIG. 2A, respectively.

Figure 3B:
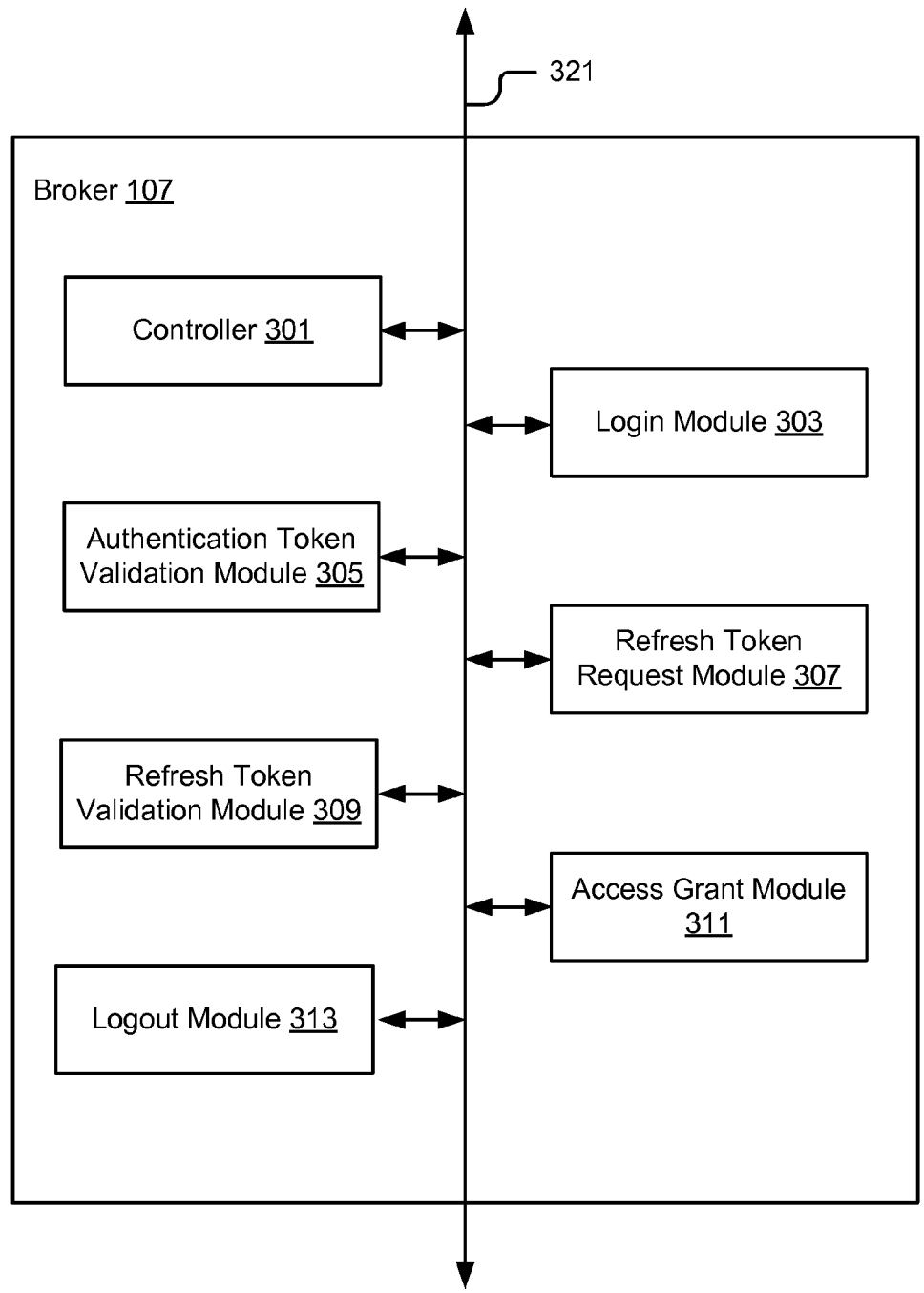
FIG. 3B is a block diagram illustrating one embodiment of a broker on an application server.

Referring now also to FIG. 3B, in some embodiments, the broker 107 may include a controller 301, a login module 303, an authentication token validation module 305, a refresh token request module 307, a refresh token validation module 309, an access grant module 311 and a logout module 313. The components of the broker 107 are communicatively coupled via the bus 321.

The controller 301 may include software and/or logic to control the operation of the other components of the broker 107. The controller 301 controls the other components of the broker 107 to perform the methods described below with reference to FIGS. 5-7 and 10. The controller 301 may also include software and/or logic to provide the functionality for handling communications between the broker 107 and other components of the application server 105 as well as between the components of the broker 107. For example, the controller 301 receives, via the communication unit 339, an authentication token from the authentication server 101 and sends the authentication token to the corresponding modules to determine its validity and grant access to a user based on a valid authentication token. In some embodiments, the controller 301 can be implemented using programmable or specialized hardware including a field-programmable gate array (FPGA) or an application-specific integrated circuit (ASIC). In some embodiments, the controller 301 can be implemented using a combination of hardware and software executable by processor 335. In some embodiments, the controller 301 is a set of instructions executable by the processor 335. In some implementations, the controller 301 is stored in the memory 337 and is accessible and executable by the processor 335. In some implementations, the controller 301 is adapted for cooperation and communication with the processor 335, the memory 337 and other components of the broker 107 via the bus 321.

The login module 303 may include software and/or logic to provide the functionality for processing a login request received from a user. In some embodiments, the login module 303 can be implemented using programmable or specialized hardware including a field-programmable gate array (FPGA) or an application-specific integrated circuit (ASIC). In some embodiments, the login module 303 can be implemented using a combination of hardware and software executable by processor 335. In some embodiments, the login module 303 is a set of instructions executable by the processor 335. In some implementations, the login module 303 is stored in the memory 337 and is accessible and executable by the processor 335. In some implementations, the login module 303 is adapted for cooperation and communication with the processor 335, the memory 337 and other components of the broker 107 via the bus 321.

The login module 303 receives a request from a user to access an application on the application server 105 and sends the request to the authentication server 101 to authenticate the user. The login module 303 supports single sign on. When a user once gets authenticated for an application via a browser, the user gets access for all other applications accessed over the same browser. Therefore the user logs in once and gains access to all applications without being prompted to log in again at each of applications.

In some embodiments, the login module 303 receives a fresh request, for example, a first request from a user for logging in the system to access a first application via a browser. The authentication server 101 generates an authentication token to authenticate the user for accessing the first application. In other embodiments, the login module 303 receives a subsequent request, for example, when the user has already logged in the first application and currently sends a second request (e.g., a REST call) to access the second application using the same browser. The first application may require session while the second application may be session less. The authentication server 101 determines that the session has already been authenticated and the user wants to access a different application. As long as the user uses the same browser to access different applications, the authentication server 101 will not authenticate again and again with the ID provider 109 for different applications. An authentication token that was generated responsive to the first request and stored in the browser (e.g., in the form of a cookie) may be used in authenticating the user for accessing the second application. For example, the login module 303 passes the authentication token to the second application through the browser.

The authentication token validation module 305 may include software and/or logic to provide the functionality for determining whether an authentication token is valid. In some embodiments, the authentication token validation module 305 can be implemented using programmable or specialized hardware including a field-programmable gate array (FPGA) or an application-specific integrated circuit (ASIC). In some embodiments, the authentication token validation module 305 can be implemented using a combination of hardware and software executable by processor 335. In some embodiments, the authentication token validation module 305 is a set of instructions executable by the processor 335. In some implementations, the authentication token validation module 305 is stored in the memory 337 and is accessible and executable by the processor 335. In some implementations, the authentication token validation module 305 is adapted for cooperation and communication with the processor 335, the memory 337 and other components of the broker 107 via the bus 321.

The authentication token validation module 305 receives an authentication token generated by the authentication token creation module 205 on the authentication server 101 and determines whether the authentication token is valid. In some embodiments, the authentication token validation module 305 determines whether an authentication token is valid based on signature validation and time validation. The authentication token validation module 305 first reforms a signature based on the authentication token and a key store, and compares the reformed signature with the signature included in the authentication token. If the signatures match, the authentication token validation module 305 determines that the signature validation succeeds. The authentication token validation module 305 then compares the current token time with the time information included in the authentication token to determine whether the time validation succeeds. If both signature validation and time validation succeed, the authentication token validation module 305 determines that the authentication token is valid.

Figure 4A:
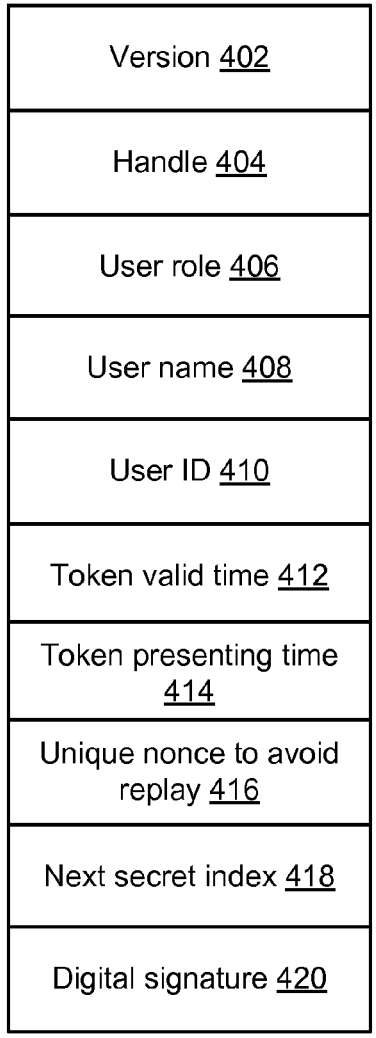
FIG. 4A is a graphical representation of one embodiment of an authentication token.

FIG. 4A is a graphic representation of an authentication token 401. In the example of FIG. 4A, the authentication token 401 includes a version 402, a handle 404, a user role 406, a user name 408, a user identity (ID) 410, a token valid time 412, a token presenting time 414, a unique nonce to avoid replay 416, a next secret index 418 and a digital signature 420.

The version 402 is the version of a key store that was used to create a secret to sign the authentication token 401. When generating the authentication token 401, the authentication token creation module 205 on the authentication server 101 creates the secret based on two 128-bit keys randomly selected from a set of keys in the key store with the version 402. The authentication token validation module 305 comprised in the broker 107 determines, from the version 402, which version of the key store was used in generating the authentication token 401 and retrieves the right information from the right version of key store to validate the authentication token 401.

The broker 107 exchanges key store information through a two-way TLS with the authentication server 101. In some embodiments, when the broker 107 redirects a request for accessing an application on the application server 105 received from a user to the authentication server 101, the broker 107 also requests key store information. The authentication server 101 generates an authentication token and sends the key store information to the broker 107 in the form of version 402. In other embodiments, the authentication server 101 uses a key store different from the key store present with the broker 107 (i.e., different versions) and notifies the broker 107 about the mismatch of the key store versions. The broker 107 receives the notification through a new version 402 and uses the new key store identified by the new version 402 to validate an authentication token.

The handle 404 is a reference that is used by the authentication server 101 to keep track of the applications requested by a user. In some embodiments, the authentication server 101 communicates with the broker 107 using the handle 404.

The user role 406 represents a user's access level in applications provided by the application servers 105 in an internal domain. The user name 408 and the user ID 410 represent the name and the ID of a user when the user logs in the system 100 to request access to an application in the internal domain. In some embodiments, the user role 406 is assigned by an administrator in the internal domain while the user name 408 and the user ID 410 are provided by the ID provider 109 in an external domain.

The token valid time 412 defines how long a user can access an application based on the authentication token. If a request for accessing an application in the internal domain is received from a user after the token valid time 412 expires, a new token (e.g., a refresh token) will be needed to authenticate the user. The token presenting time 414 is the time within which the authentication token needs to be presented to the authentication token validation module 305 at the broker 107. Failure to present the authentication token within the token presenting time 414 will lead to deny the access of the application to the user. Suppose a time frame ranging between t1 and t2 is assigned by the ID provider 109, which identifies the total valid time that a user can access one or more applications in an internal domain based on an authentication token. The token valid time 414 ($t_k$) and the token presenting time 416 ($t_p$) can be mathematically expressed as:

$$\{t_k \epsilon T_k | (t_1 < t_k < t_2) \cap (t_1 < t_p < t_k)\} \text{ and } \{t_p \epsilon T_p | (t_1 < \text{current token time} \leq t_p)\}$$

The unique nonce to avoid replay 416 is a number that notifies the authentication token validation module 305 whether the authentication token was previously visited. If the unique nonce to avoid replay 416 of the token shows that the token was previously visited, the authentication token validation module 305 will deny the token. This number is used to avoid replay attack when the authentication token is still valid.

The next secret index 418 are key indexes used next time to select the first and second 128-bit keys from the key store. The refresh token grant module 207 on the authentication server 101 uses the next secret index 418 to select the first and second 128-bit keys to generate a refresh token. In some embodiments, the next secret index 418 is in the form of "<index1>.<index2>".

Figure 4B:
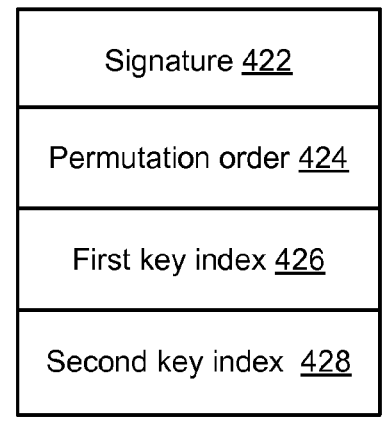
FIG. 4B is a graphical representation of one embodiment of a digital signature included in an authentication token.

The authentication token 401 also includes a digital signature 420. Referring now also to FIG. 4B, an example of the digital signature 420 is shown. The digital signature 420 includes a signature 422, a permutation order 424, a first key index 426 and a second key index 428. The signature 422 was the output of signing user information (e.g., the user role 406, the user name 408, the user ID 410) using a secret by the authentication token creation module 205. The permutation order 424 was randomly selected by the authentication token creation module 205 and was used to permute the first and second 128-bit keys selected from the key store to create the secret. The first key index 426 and the second key index 428 were randomly selected by the authentication token creation module 205 and were used to select the first 128-bit key and the second 128-bit key from the key store.

The authentication token validation module 305 determines whether an authentication token is valid based on signature validation and time validation. In signature validation, the authentication token validation module 305 validates the authentication token 401 by checking the signature originality with the same secret that was created by the authentication server 101 to sign the authentication token 401. Responsive to receiving the authentication token 401, the authentication token validation module 305 identifies the key store used in generating the authentication token 401 through the version 416. The authentication token validation module 305 then reforms the same 256-bit secret used in generating the authentication token 401 by selecting a first 128-bit key from the key store using the first key index 426, selecting a second 128-bit key from the key store using the second key index 428 and permuting the first and second 128-bit keys using the permutation order 424. Once the 256-bit secret is reformed, the authentication token validation module 305 reforms a signature by signing user information included in the authentication token 401 using the reformed secret. The user information may include the user role 406, the user name 408 and the user ID 410. The authentication token validation module 305 compares the reformed signature to the signature 422. If the reformed signature matches the signature 422, the authentication token validation module 305 determines that the signature validation succeeds. Otherwise, the authentication token 401 is invalid.

Once the signature validation succeeds, the authentication token validation module 305 determines the time validity of the authentication token 401. The authentication token validation module 305 determines whether the current time of receiving the authentication token 401 is within the token valid time 414. If yes, the authentication token validation module 305 determines whether the current time is within the token presenting time 416. If yes, the authentication token validation module 305 determines that the time validation succeeds and notifies the access grant module 311 that the authentication token 401 is valid. If the current token time exceeds either the token valid time 414 or the token presenting time 416, the authentication token validation module 305 determines that the authentication token 401 is invalid and the time validation fails. The authentication token validation module 305 then notifies the refresh token request module 307 or the access grant module 311 that the authentication token 401 is invalid.

The refresh token request module 307 may include software and/or logic to provide the functionality for generating a request for a refresh token. In some embodiments, the refresh token request module 307 can be implemented using programmable or specialized hardware including a field-programmable gate array (FPGA) or an application-specific integrated circuit (ASIC). In some embodiments, the refresh token request module 307 can be implemented using a combination of hardware and software executable by processor 335. In some embodiments, the refresh token request module 307 is a set of instructions executable by the processor 335. In some implementations, the refresh token request module 307 is stored in the memory 337 and is accessible and executable by the processor 335. In some implementations, the refresh token request module 307 is adapted for cooperation and communication with the processor 335, the memory 337 and other components of the broker 107 via the bus 321.

The refresh token request module 307 generates a request for a refresh token when receiving a subsequent request and the previously generated token is invalid. If a current request is a first subsequent request after a refresh request, the authentication token validation module 305 determines whether the authentication token previously generated based on the refresh token is valid. If the previously generated authentication token is valid, the authentication token validation module 305 skips the refresh token request module 307 and communicates with the access grant module 311 to grant the user access to the application based on the valid authentication token. However, if the previously generated authentication token is invalid, the authentication token validation module 305 communicates with the refresh token request module 307. The refresh token request module 307 generates a refresh token request and sends the request to the refresh token grant module 207 on the authentication server

101 to generate a refresh token. Based on whether the refresh token is valid, the user may or may not get the access to the application.

When the current request for a user accessing an application on the application server 105 is a $n^{th}$ (n>1) subsequent request after a refresh request and one or more subsequent requests, an authentication token and one or more refresh tokens were already generated based on the refresh token and the one or more subsequent requests, respectively. The authentication token validation module 305 first determines whether the authentication token is valid. If yes, this authentication token is used to authenticate the user responsive to the current request. If not, the validity of the one or more refresh tokens previously generated is determined. The valid previously generated refresh token is used to authenticate the user responsive to the current request. The invalid previously generated refresh token triggers the refresh token request module 307 to generate a refresh token request and send the request to the refresh token grant module 207. The refresh token grant module 207 generates a new refresh token. Based on whether the new refresh token is valid, the user may or may not get the access to the application.

The refresh token validation module 309 may include software and/or logic to provide the functionality for determining whether a refresh token is valid. In some embodiments, the refresh token validation module 309 can be implemented using programmable or specialized hardware including a field-programmable gate array (FPGA) or an application-specific integrated circuit (ASIC). In some embodiments, the refresh token validation module 309 can be implemented using a combination of hardware and software executable by processor 335. In some embodiments, the refresh token validation module 309 is a set of instructions executable by the processor 335. In some implementations, the refresh token validation module 309 is stored in the memory 337 and is accessible and executable by the processor 335. In some implementations, the refresh token validation module 309 is adapted for cooperation and communication with the processor 335, the memory 337 and other components of the broker 107 via the bus 321.

In some embodiments, the refresh token request module 307 generates a refresh token request responsive to a subsequent request for a user accessing an application on the application server 105. The refresh token grant module 207 on the authentication server 101 generates a refresh token responsive to receiving the refresh token request. The refresh token validation module 309 determines whether the refresh token is valid.

FIG. 4C is a graphic representation of a refresh token 451. In the example of FIG. 4C, the refresh token 451 includes a version 452, a new token valid time 454, a unique nonce to avoid replay 456, a next secret index 458 and a digital signature 460. Those skilled in the art will recognize that the refresh token 451 and the authentication token 401 in FIG. 4A share some same or similar components. For example, both the refresh token 451 and the authentication token 401 include the version (452, 402), the unique nonce to avoid replay (456, 416) and the next secret index (458, 418). The descriptions of these components will not be repeated here.

The refresh token 451 also includes a new token valid time 452 and a digital signature 460. The new token valid time 452 defines how long the refresh token 451 would be valid for a user accessing an application. For example, the new token valid time 452 for a refresh token 451 is depicted as a dashed box in FIG. 4E. The digital signature 460 shown in FIG. 4D includes a signature 462 and a permutation order 464. The signature 462 and the permutation order 464 are similar to the signature 422 and the permutation order 424 in FIG. 4B, respectively, and will not repeatedly described here.

The refresh token validation module 309 validates the refresh token 451 by checking the signature originality based on applying the same secret generation algorithm. In some embodiments, the refresh token validation module 309 validates the refresh token 451 in a similar way as the authentication token validation module 305 validates the authentication token 401 based on signature validation. One difference is that the refresh token validation module 309 uses the next secret index 458 to select the first and second 128-bit keys to reform the secret. Depending on whether the refresh token is valid, the refresh token validation module 309 communicates the access grant module 311 or the logout module 313 for further processing.

The access grant module 311 may include software and/or logic to provide the functionality for granting a user access to an application based on a valid token. In some embodiments, the access grant module 311 can be implemented using programmable or specialized hardware including a field-programmable gate array (FPGA) or an application-specific integrated circuit (ASIC). In some embodiments, the access grant module 311 can be implemented using a combination of hardware and software executable by processor 335. In some embodiments, the access grant module 311 is a set of instructions executable by the processor 335. In some implementations, the access grant module 311 is stored in the memory 337 and is accessible and executable by the processor 335. In some implementations, the access grant module 311 is adapted for cooperation and communication with the processor 335, the memory 337 and other components of the broker 107 via the bus 321.

When an unauthenticated user sends a request for accessing an application on the application server 105, multiple modules on the application server 105 and the authentication sever 101 are used to authenticate the user. In some embodiments, the authentication token creation module 205 on the authentication server 101 generates an authentication token and the authentication token validation module 305 on the application server 105 determines that the authentication token is valid. Responsive to receiving a notification of a valid authentication token, the access grant module 311 grants the user the access to the application. In other embodiments, the refresh token grant module 207 on the authentication server 101 generates a refresh token and the refresh token validation module 309 on the application server 105 determines that the refresh token is valid. Responsive to receiving a notification of a valid refresh token, the access grant module 311 grants the user the access to the application.

The logout module 313 may include software and/or logic to provide the functionality for processing a logout request. In some embodiments, the logout module 313 can be implemented using programmable or specialized hardware including a field-programmable gate array (FPGA) or an application-specific integrated circuit (ASIC). In some embodiments, the logout module 313 can be implemented using a combination of hardware and software executable by processor 335. In some embodiments, the logout module 313 is a set of instructions executable by the processor 335. In some implementations, the logout module 313 is stored in the memory 337 and is accessible and executable by the processor 335. In some implementations, the logout module 313 is adapted for cooperation and communication with the processor 335, the memory 337 and other components of the broker 107 via the bus 321.

In some embodiments, the logout module 313 receives a logout request from a user. In other embodiments, the authentication token creation module 205 on the authentication server 101 fails to generate a new authentication token responsive to receiving a request to access an application from a user is currently logged in. The authentication token creation module 205 sends a notification to the logout module 313 about the failure. The logout module 313 handles the notification as a logout request. Responsive to receiving a logout request, the logout module 309 invalidates the application session that the user is currently logged in. The logout module 309 also sends the logout request to the authentication server 101 to log the user out of all other systems that the user is currently logged in. The other systems includes the ID provider 109.

Methods

Figure 5:
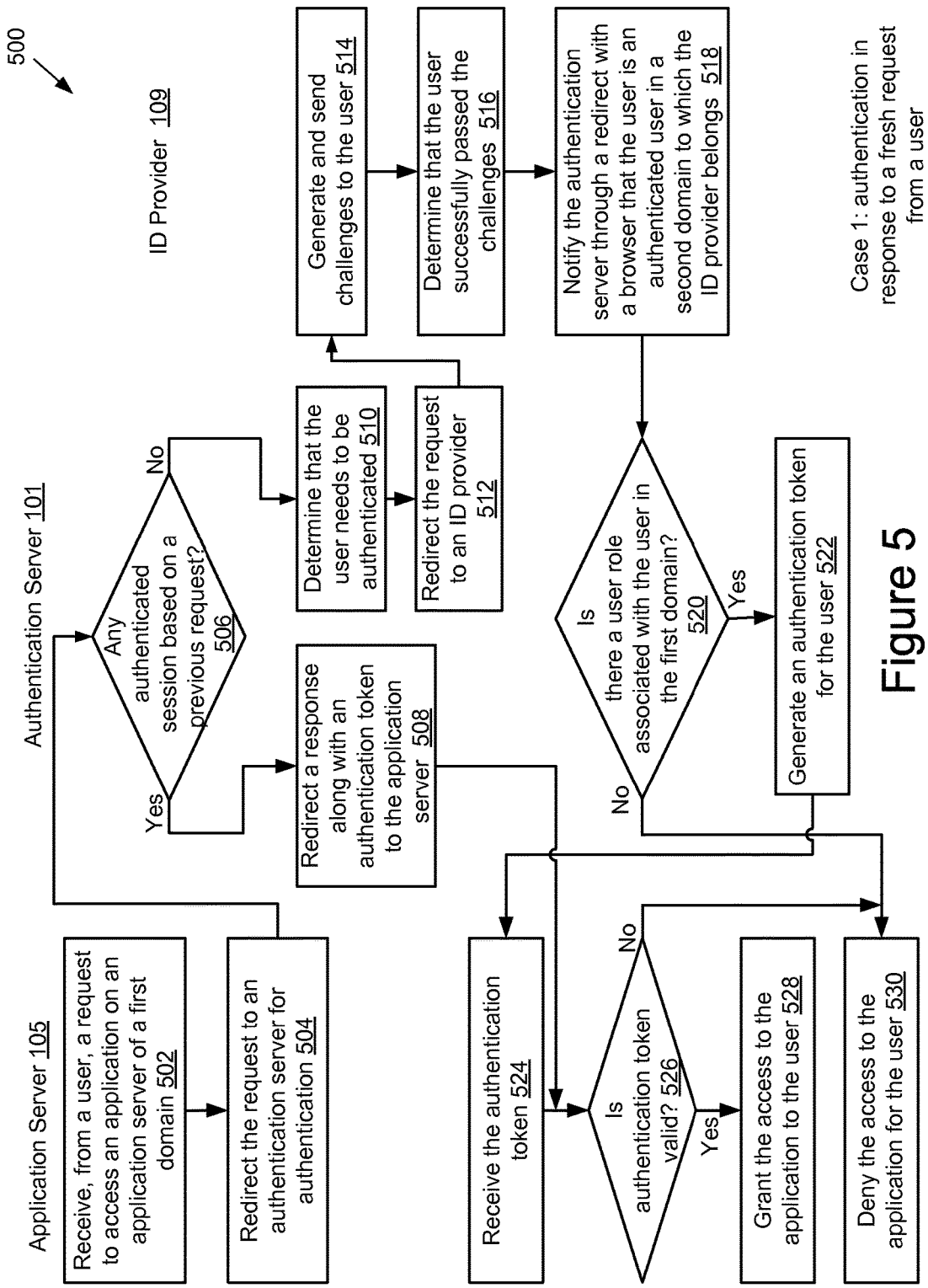
FIG. 5 is a flow diagram illustrating one embodiment of a method for authenticating a user in response to receiving a fresh request from the user.

FIG. 5 is a flow diagram illustrating one embodiment of a method 500 for authenticating a user in response to receiving a fresh request from the user. The system 100 in FIG. 1A includes an authentication server 101, an application server 105 and an ID provider 109. At 502, the application server 105 receives, from a user, a request to access an application on an application server of a first domain. At 504, the application server 105 redirects the request to an authentication server 101 for authentication. At 506, the authentication server 101 determines whether an authenticated session based on a previous request exists. If the authentication server request session is already authenticated based on one or more previous login requests for other applications, at 508, the authentication module 103 redirects a response along with an the authentication token back to the application server 105 in the first domain. The authentication server 101 generates the authentication token based on previous requests. The method 500 then moves to 526. If no authenticated session is determined to be present in 506, at 510, the authentication module 103 determines that the user needs to be authenticated. At 512, the authentication server 101 redirects the request to an ID provider 109.

At 514, the ID provider 109 generates and sends challenges to the user. At 516, the ID provider 109 determines that the user successfully passed the challenges. At 518, the ID provider 109 notifies the authentication module 103 that the user is an authenticated user in the second domain to which the ID provider 109 belongs. The authenticated user in the second domain can access any applications in the second domain. In some embodiments, the ID provider 109 notifies the authentication server through a redirect with a browser.

At 520, the authentication server 101 determines if there is a user role associated with the user in the first domain. A user role determines the user's access level in the applications provided by the application servers 105 in the first domain. A user role may be assigned by an administrator of the application server 105. If a user role associated with the user in the first domain is present, at 522, the authentication server 101 generates an authentication token for the user.

At 524, the application server 105 receives the authentication token. At 526, the application server 105 determines whether the authentication token is valid. If the authentication token is valid in 526, at 528, the application server 105 grants the access to the application to the user. If the authentication token is invalid in 526 or a user role associated with the user in the first domain is not present in 520, the method 500 moves to 530 where the application server 105 denies the access to the application for the user.

Figure 6:
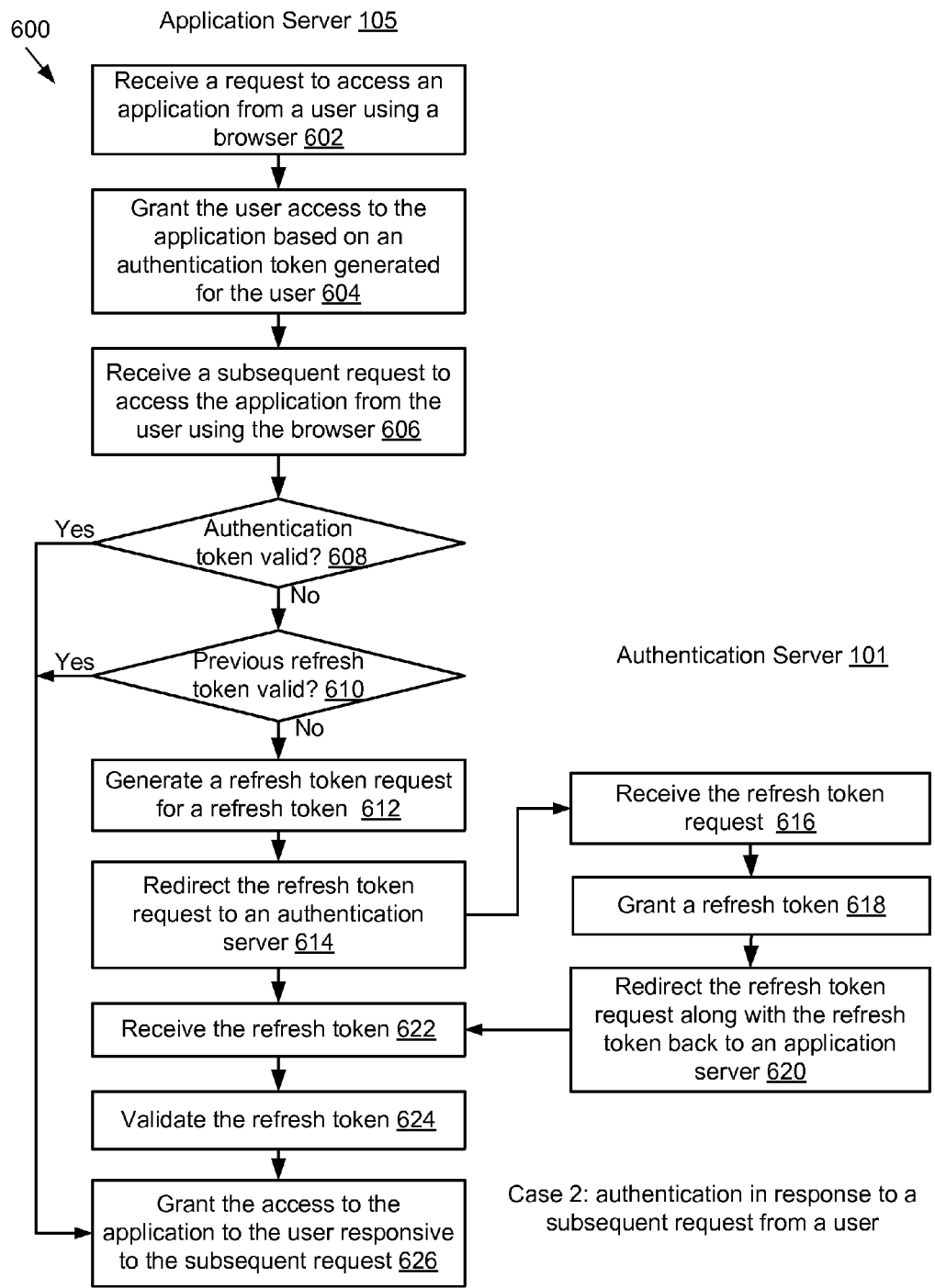
FIG. 6 is a flow diagram illustrating one embodiment of a method for authenticating a user in response to receiving a subsequent request from the user.

FIG. 6 is a flow diagram illustrating one embodiment of a method 600 for authenticating a user in response to receiving a subsequent request from the user. The system 100 in FIG. 1A includes an authentication server 101 and an application server 105. At 602, the application server 105 receives a request to access an application from a user using a browser. At 604, the application server 105 grants the user access to the application based on an authentication token generated for the user. At 606, the application server 105 receives a subsequent request to access the application from the user using the browser.

At 608, the application server 105 determines whether the authentication token is valid. If the authentication token is valid, the method 600 moves to 626 to grant the access to the application to the user. If the authentication token is found invalid at 608, the application server 105 determines at 610 whether a previous refresh token is valid. If the previous refresh token is valid at 608, the method 600 moves to 626 to grant the access to the application to the user. If the previous refresh token is found invalid at 610, the application server 105 generates at 612 a refresh token request. At 614, the application server 105 redirects the refresh token request to an authentication server.

At 616, the authentication server 101 receives the refresh token request. At 618, the authentication server 101 grants a refresh token. At 620, the authentication server 101 redirects the refresh token request along with the refresh token back to the application server 105.

At 622, the application server 105 receives the refresh token. At 624, the application server 105 validates the refresh token. Once the refresh token is validated, at 626, the application server 105 grants the access to the application to the user responsive to the subsequent request.

Figure 7:
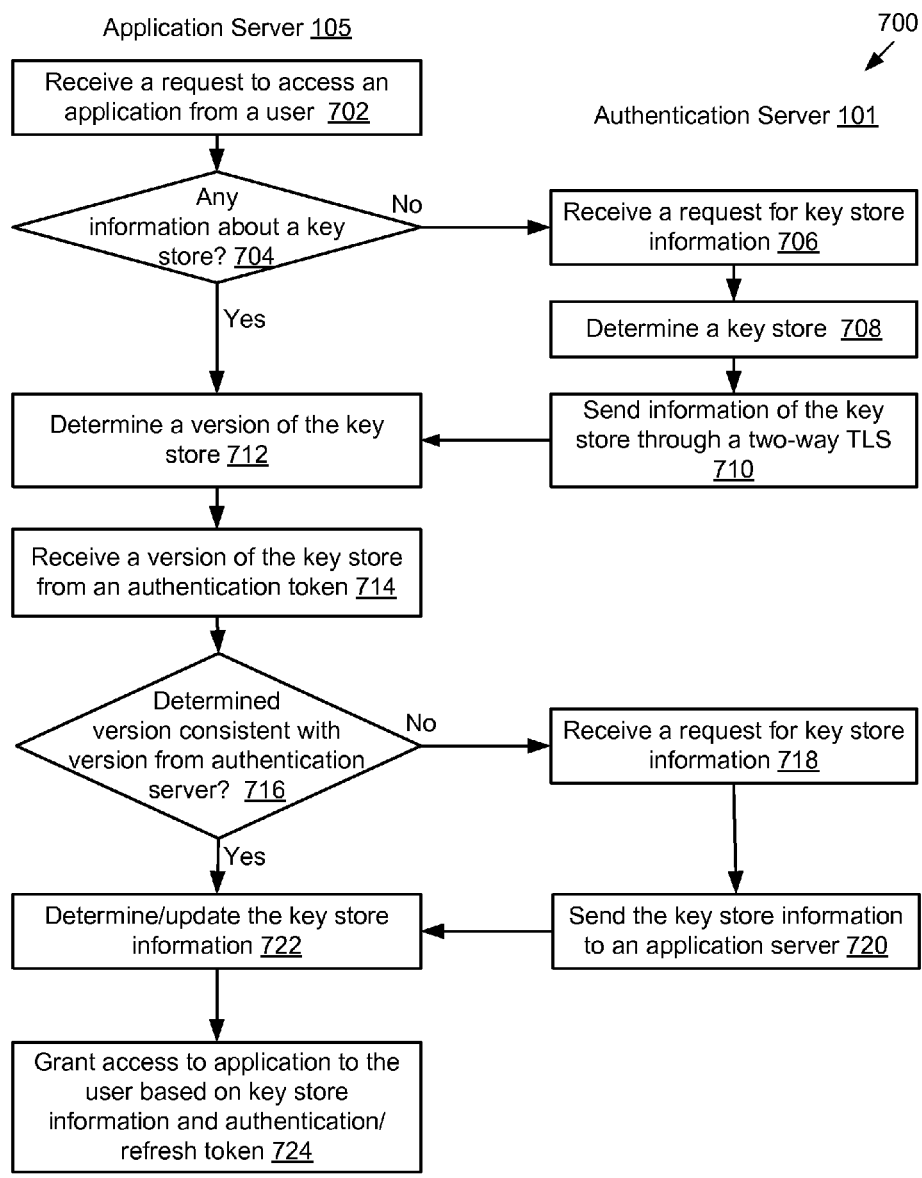
FIG. 7 is a flow diagram illustrating one embodiment of a method for exchanging key store information between an application server and an authentication server.

FIG. 7 is a flow diagram illustrating one embodiment of a method 700 for exchanging key store information between an application server 105 and an authentication server 101. At 702, the application server 105 receives a request to access an application from a user. At 704, the application server 105 determines whether there is any information about a key store. In some embodiments, this request received at 702 may be a fresh request after application server 105 started and the authentication token creation module 205 has not yet shared any secret with the broker 107; and thus, the broker 107 contains no key store information. In other embodiments, the broker 107 has already stored key store information because of the authenticated session based on one or more previous requests.

If the application server 105 does not have any information about a key store, the application server 105 sends a request for key store information. At 706, the authentication server 101 receives a request for key store information. At 708, the authentication server 101 determines a key store. At 710, the authentication server 101 sends information of the key store through a two-way TLS to the application server 105. If the application server 105 has information about the key store as determined in 704, the method 700 moves directly to 712.

At 712, the application server 105 determines a version of the key store. At 714, the application server 105 receives a version of the key store from an authentication token. At 716, the application server 105 determines whether the version determined from the token at the application server 105 is consistent with the version received from the authentication server 101. If the two versions are inconsistent, the method 700 moves to 718. At 718, the authentication server 101 receives a request for key store information. At 720, the authentication server 101 sends the key store information to an application server 105.

If the two versions are consistent, the method 700 moves to 722. At 722, the application server 105 determines/updates the key store information. At 724, the application server 105 grants access of the application to the user based on the key store information and an authentication/refresh token.

Figure 8:
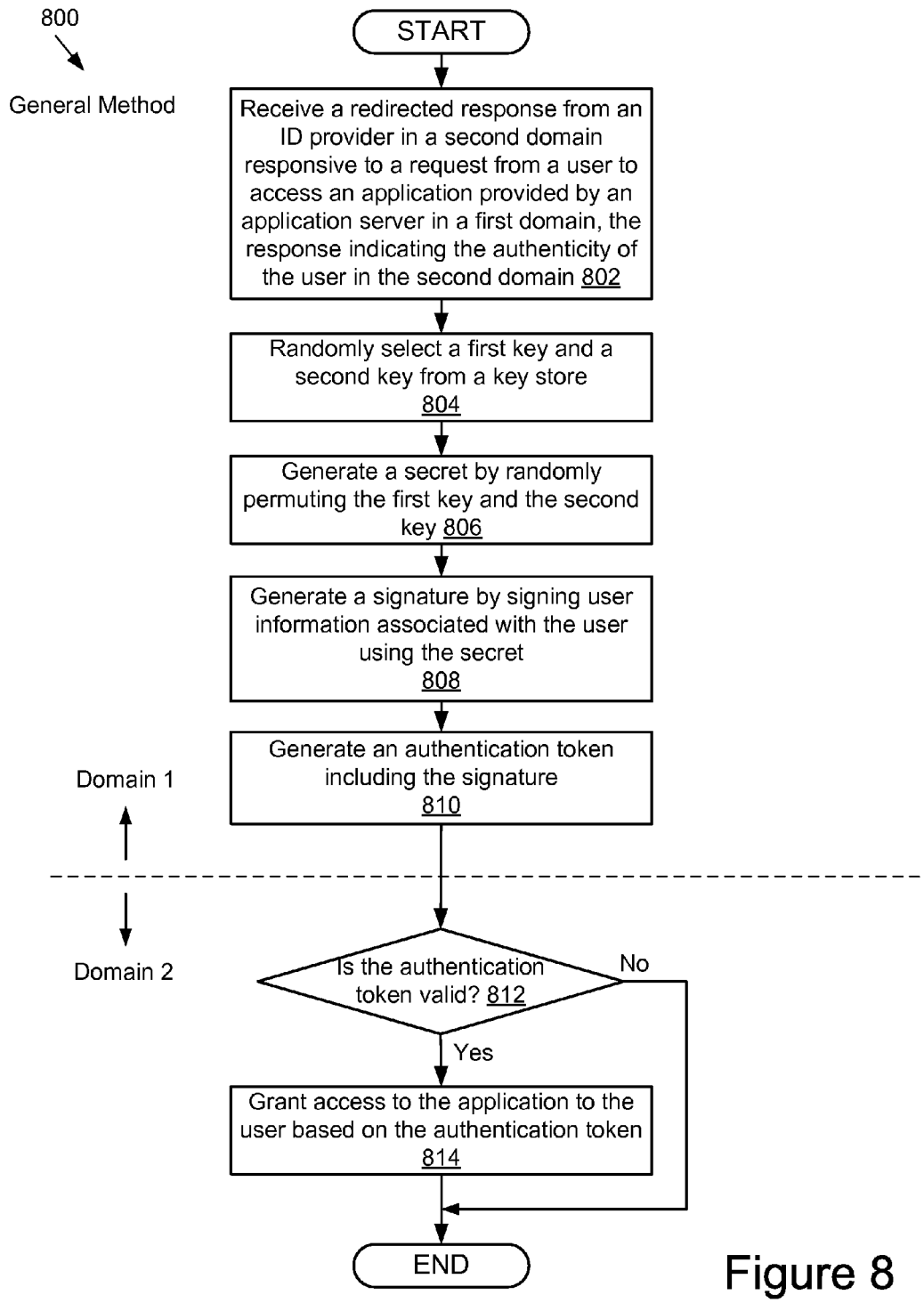
FIG. 8 is a flow diagram illustrating one embodiment of a method for granting access to an application by authenticating a user requesting access to an application in a domain based on an authentication token.

FIG. 8 is a flow diagram illustrating one embodiment of a method 800 for granting access to an application by authenticating a user requesting access to an application in a domain based on an authentication token. The authentication server 101 comprises an authentication module 103. The authentication module 103 comprises a login module 203, an authentication token creation module 205, a refresh token grant module 207 and a logout module 209.

At 802, the login module 203 receives a redirected response from an ID provider in a second domain responsive to a request from a user to access an application provided by an application server in a first domain, the response indicating the authenticity of the user in the second domain. At 804, the authentication token creation module 205 randomly selects a first key and a second key from a key store. At 806, the authentication token creation module 205 generates a secret by randomly permuting the first key and the second key. At 808, the authentication token creation module 205 generates a signature by signing user information associated with the user using the secret. At 810, the authentication token creation module 205 generates an authentication token including the signature. The authentication token 103 then transmits the authentication token to the broker 107 at the application server 105 via the controller 201. The application server 105 is in the first domain.

The broker 107 at the application server 105 comprises an authentication token validation module 305 and an access grant module 311. Once the authentication token is presented at the broker 107, at 812, the authentication token validation module 305 in the second domain determines whether the authentication token is valid. If the authentication token is valid, at 814, the access grant module 311 in the second domain grants access to the application to the user based on the authentication token. If the authentication token is invalid, the method 800 ends.

Figure 9:
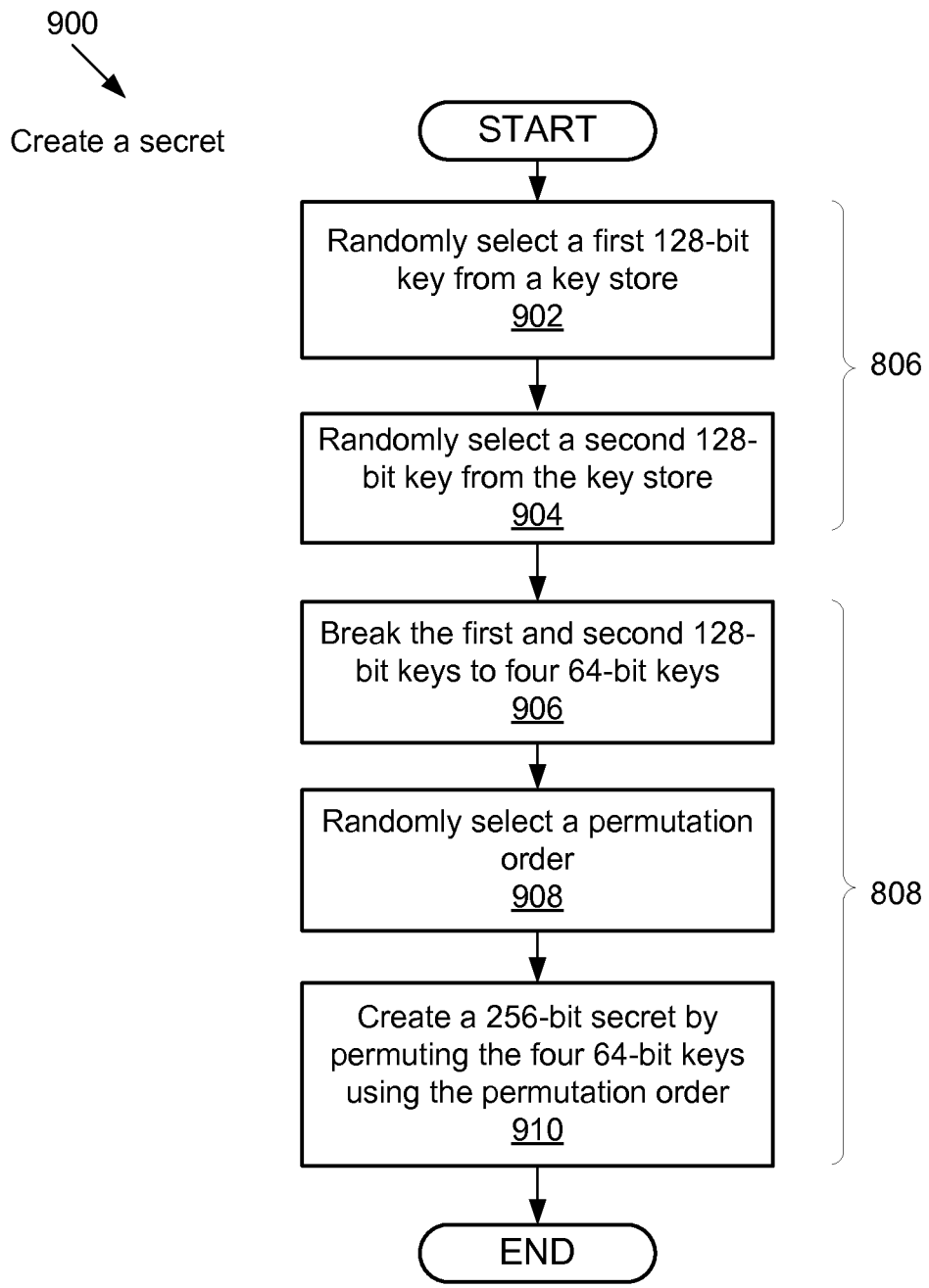
FIG. 9 is a flow diagram illustrating one embodiment of a method for creating a secret at an authentication server.

FIG. 9 is a flow diagram 900 illustrating one embodiment of a method for creating a secret by the authentication server 101. The authentication server 101 comprises an authentication module 103, which includes an authentication token creation module 205. The authentication token creation module 205 uses the secret to generate an authentication token. At 902, the authentication token creation module 205 randomly selects a first 128-bit key from a key store. At 904, the authentication token creation module 205 randomly selects a second 128-bit key from the key store. In some embodiments, steps 902 and 904 are included in step 806 in FIG. 8.

At 906, the authentication token creation module 205 breaks the first and second 128-bit keys to four 64-bit keys. At 908, the authentication token creation module 205 randomly selects a permutation order. At 910, the authentication token creation module 205 creates a 256-bit secret by permuting the four 64-bit keys using the permutation order. In some embodiments, steps 906, 908 and 910 are included in step 808 in FIG. 8.

Figure 10:
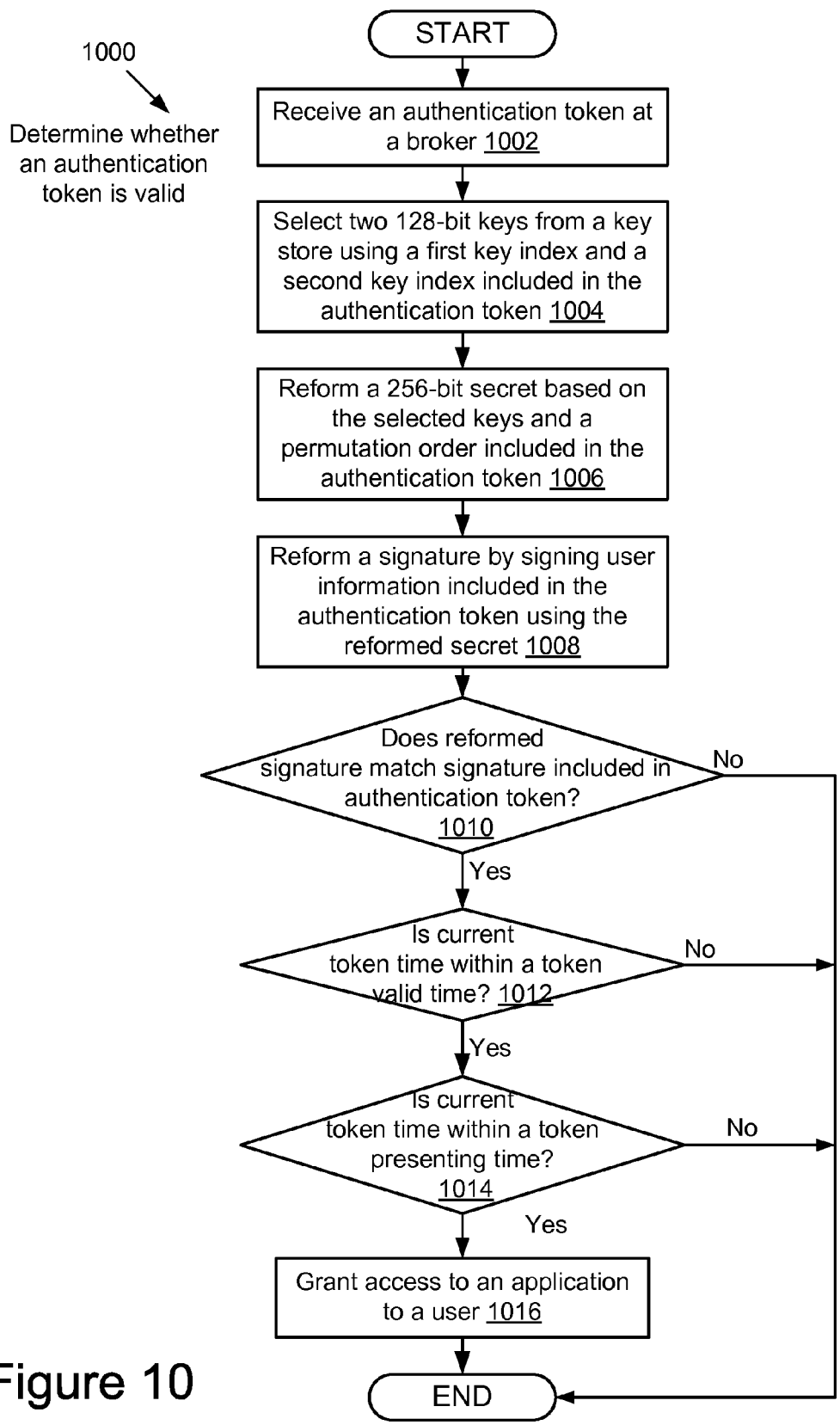
FIG. 10 is a flow diagram illustrating one embodiment of a method for determining whether an authentication token is valid at a broker of an application server.

FIG. 10 is a flow diagram 1000 illustrating one embodiment of a method for determining whether an authentication token is valid at the broker 107 on the application server 105. The broker 107 comprises an authentication token validation module 305 and an access grant module 311. At 1002, the authentication token validation module 305 receives an authentication token at a broker. At 1004, the authentication token validation module 305 selects two 128-bit keys from a key store using a first key index and a second key index included in the authentication token.

At 1006, the authentication token validation module 305 reforms a 256-bit secret based on the selected keys and a permutation order included in the authentication token. At 1008, the authentication token validation module 305 reforms a signature by signing user information included in the authentication token using the reformed secret. At 1010, the authentication token validation module 305 determines whether the reformed signature matches the signature included in the authentication token. If the reformed signature matches the signature included in the authentication token, at 1012, the authentication token validation module 305 determines whether the current token time is within a token valid time. If the current token time is within the token valid time, the authentication token validation module 305 determines whether the current token time is within a token presenting time. If the current token time is within the token presenting time, the authentication token validation module 305 notifies the access grant module 311. At 1016, the access grant module 311 grants access to an application to a user.

At 1010, 1012 and 1014, the authentication token validation module 305 may determine that the reformed signature does not match the signature included in the authentication token, or the current token time is not within the token valid time, or the current token time is not within the token presenting time. If any of these negative determination occurs, the method 1000 ends.

Figure 11:
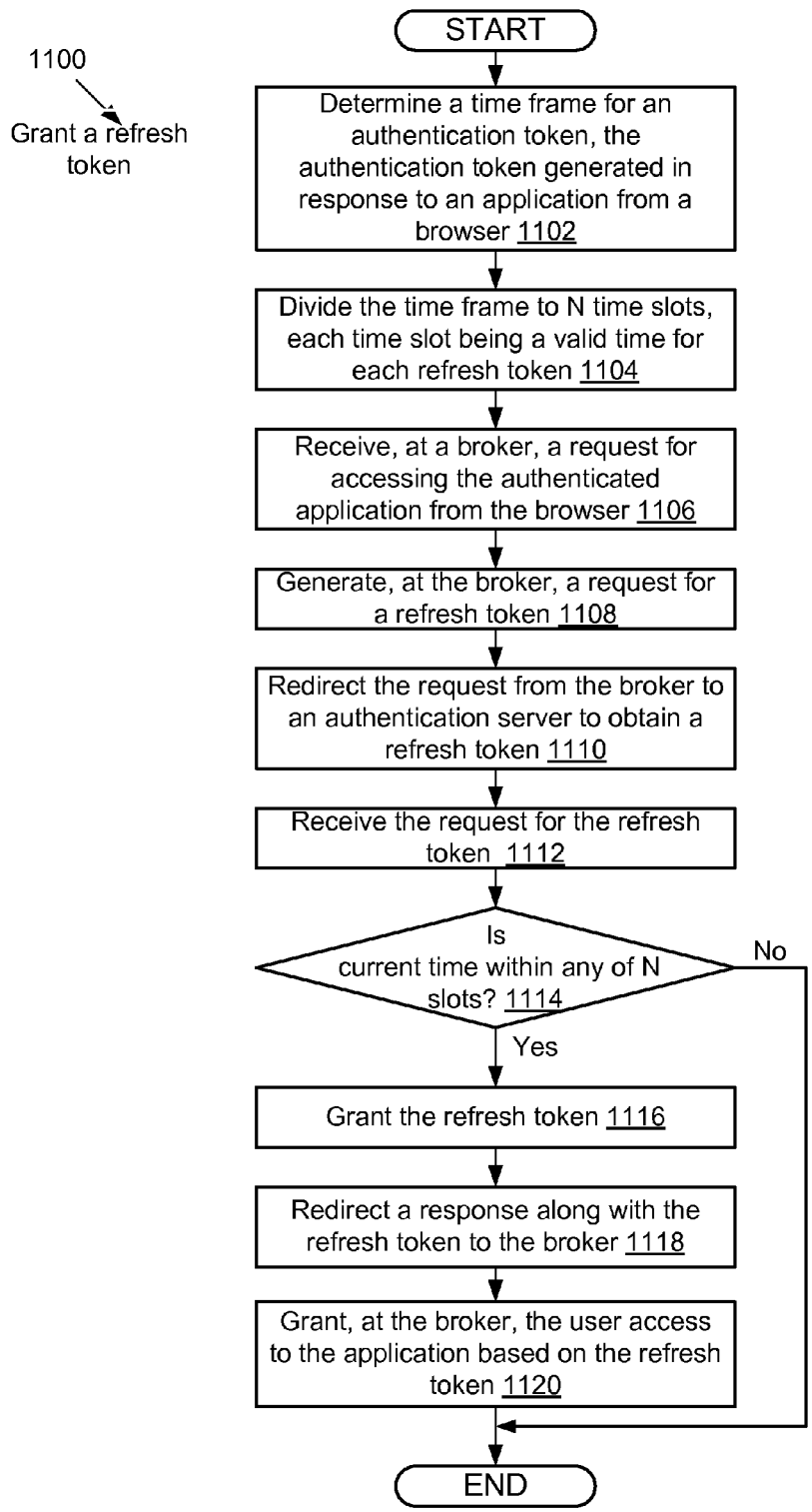
FIG. 11 is a flow diagram illustrating one embodiment of a method for granting a refresh token at an authentication server.

FIG. 11 is a flow diagram illustrating one embodiment of a method 1100 for granting a refresh token. The system 100 comprises an authentication server 101 and an application server 105. The authentication module 103 on the authentication server 101 comprises a refresh token grant module 207. The broker 107 on the application server 105 comprises a login module 303, a refresh token request module 307 and an access grant module 311.

At 1102, the refresh token grant module 207 on the authentication server 101 determines a time frame for an authentication token, the authentication token generated responsive to a request for accessing a first application from a browser. At 1104, the refresh token grant module 207 divides the time frame to N time slots, each time slot being a valid time for each refresh token.

At 1106, the login module 303 receives, at the broker 107, a request for accessing the authenticated application from the browser. The login module 303 passes the request to the refresh token request module 307. At 1108, the refresh token request module 307 generates, at the broker 107, a request for a refresh token. At 1110, the refresh token request module 307 redirects the request from the broker 107 to the authentication server 101 to obtain a refresh token.

At 1112, the refresh token grant module 207 on the authentication server 101 receives the request for the refresh token. At 1114, the refresh token grant module 207 determines whether the current time is within any of N slots. If the current time is not within any of N slots, the method 1100 ends. If the current time is within a slot of the N slots, at 1116, the refresh token grant module 207 grants the refresh token to the user. At 1118, the refresh token grant module 207 redirects a response along with the refresh token to the broker 107. The access grant module 311 on the broker 107 grants farther access to the application to the user based on the refresh token.

Figure 12:
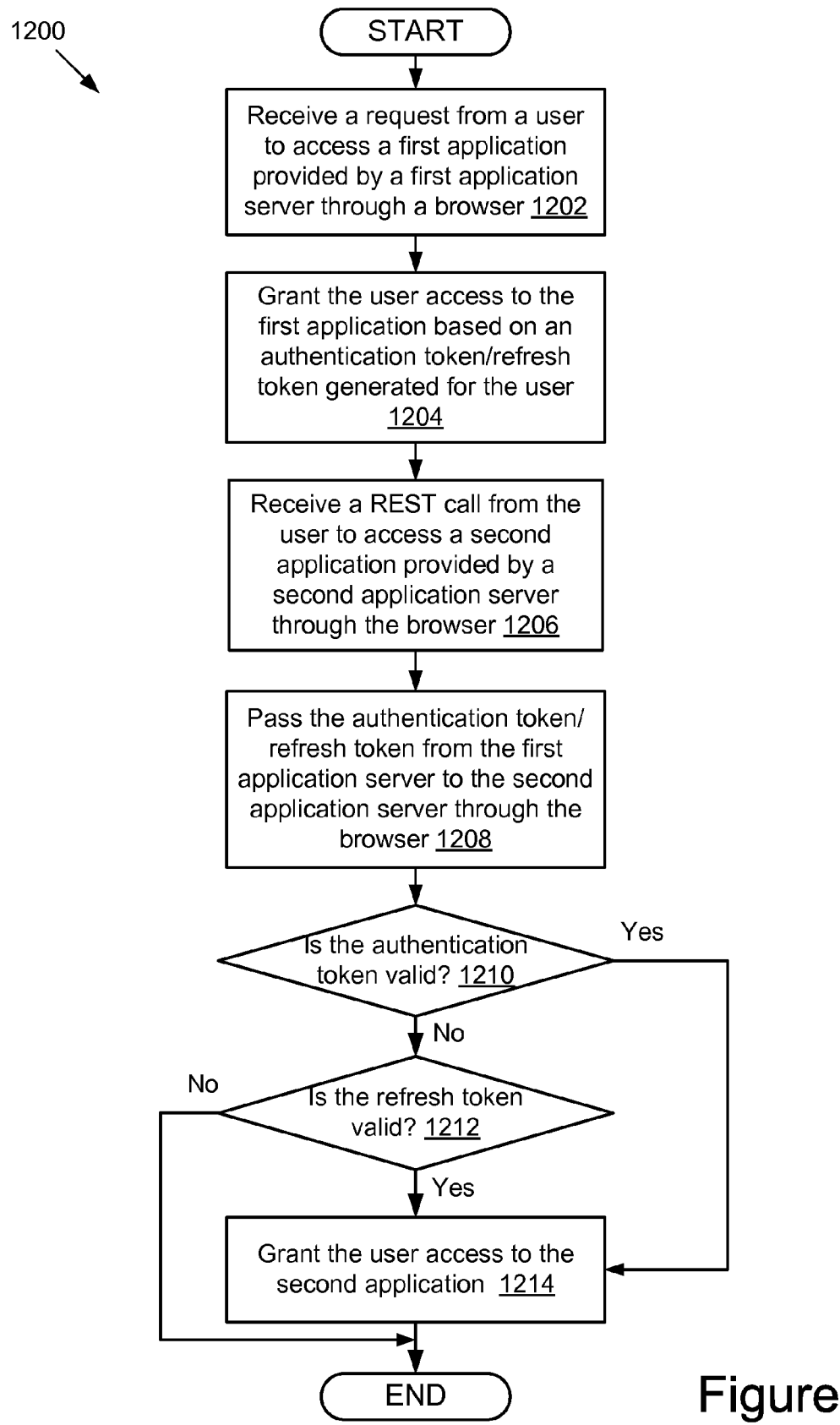
FIG. 12 is a flow diagram illustrating one embodiment of a method for authenticating a user requesting access to an application via REST calls.

FIG. 12 is a flow diagram illustrating one embodiment of a method 1200 for authenticating a user requesting access to an application via REST calls. The broker 107 on the application server 105 comprises a login module 303, an authentication token validation module 305, a refresh token validation module 309 and an access grant module 311.

At 1202, the login module 303 on a first application server receives a request to access a first application provided by the first application server through a browser. At 1204, the access grant module 311 on the first application server grants the user access to the first application based on the authentication token or a refresh token generated for the user.

At 1206, the login module 303 on a second application server receives a REST call from the user to access a second application provided by the second application server through the same browser. The second application server is a REST-based server and provides session-less application. At 1208, the login module 303 on the first application server passes the authentication token or the refresh token from the first application server to the second application server through the browser.

At 1210, the authentication token validation module 305 on the second application server determines whether the authentication token is valid. The validation of the authentication token includes signature validation and time validation. For example, the broker 107 may request a key store from the authentication server if not key store is present through 2-way TLS. Further, the broker 107 may validate the key store version of the token and the one presented with it as has been described above. If the authentication token is valid, the method 1200 moves to 1214, where the access grant module 311 grants the user access to the second application. If the authentication token is invalid, the authentication token validation module 305 notifies the refresh token validation module 309 to check the validity of the refresh token.

At 1212, the refresh token validation module 309 on the second application server determines whether the refresh token is valid. If the refresh token is valid, at 1214, the access grant module 311 grants the user access to the second application. If not, the access grant module 311 denies the user access to the second application and the method 1200 ends.

A system and method for granting a token to authenticate a user requesting access to an application in a domain has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving, with one or more processors, a response from an identity provider in a second domain responsive to a first request from a user to access an application provided by an application server in a first domain, the response indicating the authenticity of the user in the second domain;
   randomly selecting a first key and a second key from a key store;
   generating, with the one or more processors, a secret by randomly permuting the first key and the second key;
   generating, with the one or more processors, a signature by signing user information associated with the user using the secret;
   determining whether there is a user role associated with the user in the first domain;
   responsive to determining that there is the user role associated with the user in the first domain, generating an authentication token including the signature and index information for generating a refresh token associated with the authentication token, the authentication token being associated with a time frame;
   dividing the time frame associated with the authentication token into a plurality of time slots;
   receiving a request for the refresh token from the application server in the first domain;
   determining whether a receiving time of the request for the refresh token is within a first time slot in the plurality of time slots; and
   responsive to determining that the receiving time of the request for the refresh token is within the first time slot in the plurality of time slots, generating the refresh token associated with the authentication token using the index information, the refresh token being valid during the first time slot.

2. The method of claim 1, wherein the authentication token is used for both session-based and session-less authentication.

3. The method of claim 1, wherein generating the authentication token including the signature is independent from an authentication scheme utilized by the identity provider.

4. The method of claim 1, comprising:
   determining, at the application server, whether the authentication token is valid; and
   responsive to determining that the authentication token is valid, granting, at the application server, access to the application to the user based on the authentication token.

5. The method of claim 4, wherein determining, at the application server, whether the authentication token is valid comprises:
   reforming a secret based on first information included in the authentication token;
   reforming a signature by signing second information included in the authentication token using the reformed secret;
   comparing, with the one or more processors, the reformed signature with the signature included in the authentication token; and
   determining whether the authentication token is valid based on the comparison.

6. The method of claim 4, wherein determining, at the application server, whether the authentication token is valid comprises comparing a current token time with a token presenting time included in the authentication token.

7. The method of claim 1, comprising updating a version of the key store, and wherein randomly selecting the first key and the second key is based on the updated version of the key store.

8. The method of claim 1, wherein the key store is shared with a trusted group using a two-way transport layer security protocol.

9. The method of claim 1, comprising:
   authenticating the user in the second domain at the identity provider;
   generating, by the identity provider, the response indicating the authenticity of the user in the second domain; and redirecting the response from the identify provider to an authentication server.

10. The method of claim 9, wherein authenticating the user in the second domain is based on a federated identity authentication approach.

11. The method of claim 1, wherein the user role represents a level of access in the application provided by the application server in the first domain.

12. The method of claim 1, wherein the first request is received from the user using a browser and the refresh token is generated for a second request received from the user via the browser, the method further comprising:
determining whether the refresh token is valid; and
responsive to determining that the refresh token is valid, granting access to the user for the second request.

13. A system comprising:
one or more processors; the one more processors configured to:
receive a response from an identity provider in a second domain responsive to a first request from a user to access an application provided by an application server in a first domain, the response indicating the authenticity of the user in the second domain;
randomly select a first key and a second key from a key store;
generate a secret by randomly permuting the first key and the second key;
generate a signature by signing user information associated with the user using the secret;
determine whether a user role associated with the user is present in the first domain;
responsive to determining that the user role associated with the user is present in the first domain, generate an authentication token including the signature and index information for generating a refresh token associated with the authentication token, the authentication token being associated with a time frame;
divide the time frame associated with the authentication token into a plurality of time slots;
receive a request for the refresh token from the application server in the first domain;
determine whether a receiving time of the request for the refresh token is within a first time slot in the plurality of time slots; and
responsive to determining that the receiving time of the request for the refresh token is within the first time slot in the plurality of time slots, generate the refresh token associated with the authentication token using the index information, the refresh token being valid during the first time slot.

14. The system of claim 13, wherein the application server having a processor and memory, the application server configured to:
determine whether the authentication token is valid; and
responsive to determining that the authentication token is valid, grant access to the application to the user based on the authentication token.

15. The system of claim 13, wherein the application server is also configured to determine whether the authentication token is valid by:
reforming a secret based on first information included in the authentication token;
reforming a signature by signing second information included in the authentication token using the reformed secret;
comparing the reformed signature with the signature included in the authentication token; and
determining whether the authentication token is valid based on the comparison.

16. The system of claim 13, wherein the application server is also configured to determine whether the authentication token is valid by comparing a current token time with a token presenting time included in the authentication token.

17. The system of claim 13, wherein the one or more processors are further configured to update a version of the key store, and wherein randomly selecting the first key and the second key is based on the updated version of the key store.

18. The system of claim 13, wherein the identity provider having a processor and memory, the identity provider configured to:
authenticate the user in the second domain;
generate the response indicating the authenticity of the user in the second domain; and
send the response from the identity provider to an authentication server.

19. The system of claim 13, wherein the application server separates patient profile information from patient medical data and patient medical data does not contain any data that can uniquely identify a patient.

20. The system of claim 13, wherein the first request is received from the user using a browser and the refresh token is generated for a second request received from the user via the browser, the one or more processors further configured to:
determine whether the refresh token is valid; and
responsive to determining that the refresh token is valid, grant access to the user for the second request based on the refresh token.

* * * * *